(12) United States Patent
Lee et al.

(10) Patent No.: US 7,263,506 B2
(45) Date of Patent: Aug. 28, 2007

(54) IDENTIFICATION AND MANAGEMENT OF FRAUDULENT CREDIT/DEBIT CARD PURCHASES AT MERCHANT ECOMMERCE SITES

(75) Inventors: Walter W. Lee, La Mesa, CA (US); Joseph P. Milana, San Diego, CA (US); Wesley K. Wilhelm, Spokane, WA (US); Min Shao, San Diego, CA (US)

(73) Assignee: Fair Isaac Corporation, San Diego, CA (US)

( * ) Notice: Subject to any disclaimer, the term of this patent is extended or adjusted under 35 U.S.C. 154(b) by 1276 days.

(21) Appl. No.: 09/782,681

(22) Filed: Feb. 12, 2001

(65) Prior Publication Data

US 2002/0099649 A1    Jul. 25, 2002

Related U.S. Application Data

(60) Provisional application No. 60/195,156, filed on Apr. 6, 2000.

(51) Int. Cl.
*G06Q 40/00* (2006.01)

(52) U.S. Cl. .................... 705/38; 705/44; 705/39; 705/1

(58) Field of Classification Search ............... 705/38, 705/44, 39, 76, 1
See application file for complete search history.

(56) References Cited

U.S. PATENT DOCUMENTS

| | | | |
|---|---|---|---|
| 5,819,226 A | * | 10/1998 | Gopinathan et al. ......... 705/44 |
| 5,982,891 A | | 11/1999 | Ginter et al. ................. 380/4 |
| 6,029,154 A | * | 2/2000 | Pettitt ........................... 705/44 |
| 6,029,195 A | | 2/2000 | Herz ........................... 709/219 |
| 6,070,141 A | | 5/2000 | Houvener et al. ............. 705/1 |
| 6,282,658 B2 | * | 8/2001 | French et al. ............... 713/201 |
| 2001/0032192 A1 | * | 10/2001 | Putta et al. .................. 705/76 |

OTHER PUBLICATIONS

Humpert, B., *Neurocomputing in Financial Services*, Expert Systems for Information Management, vol. 2 No. 3, pp. 172-199 (1989).
O'Heney, S., *Banks Finally Solve AI Mystery*, Computers in Banking (1990).
Demby, E. *Fighting Fraud in Cyberspace Collections and Credit Risk*, Apr. 2000, vol. 5, No. 4 pp. 67,72.
Murphy, P. *Fighting Internet Card Fraud, Credit Card Management*, Jul. 2000, vol. 13, No. 4, pp. 18-26.
*Vendors Cast Their Neural Nets to Catch Fraud in Online Sales*; Debt Card News, vol. 4, No. 23, May, 1999.
International Search Report for PCT/US01/30193.

* cited by examiner

Primary Examiner—Frantzy Poinvil
Assistant Examiner—Siegfried E. Chencinski
(74) Attorney, Agent, or Firm—Michael A. Glenn; Glenn Patent Group

(57) ABSTRACT

Transaction processing of online transactions at merchant sites determines the likelihood that such transactions are fraudulent, accounting for unreliable fields of a transaction order, which fields do not reliably identify a purchaser. A scoring server using statistical model uses multiple profiles associated with key fields, along with weights to indicate the degree to which the profiles identify the purchaser of the transaction.

49 Claims, 7 Drawing Sheets

IDENTIFICATION AND MANAGEMENT OF FRAUDULENT CREDIT/DEBIT CARD PURCHASES AT MERCHANT ECOMMERCE SITES

CROSS REFERENCE TO RELATED APPLICATIONS

This application claims priority under 35 U.S.C. §119(e) from provisional application Ser. No. 60/195,156 filed on Apr. 6, 2000, which is incorporated by reference in its entirety.

FIELD OF THE INVENTION

This invention relates generally to transaction processing to identify fraudulent transactions, and more particularly, transaction processing of online payment transactions occurring over public networks to identify fraudulent transactions.

BACKGROUND OF THE INVENTION

Credit card purchases of goods and services over the Internet are now a common practice. In a typical transaction, a consumer selects some number of items to purchase, provides information identifying themselves, such as name, address, and the like, and provides payment information typically in the form of a credit card.

There is, however, great risk associated with merchants doing business on the Internet. The anonymity of online customers makes the incidence of fraud incomparably higher for online merchants than for brick-and-mortar, in-house shopping venues, where the customer is present for all transactions. In March of 1999, Visa International, Inc. reported in Computerworld that less than 2% of their credit-card transactions occurred over the Internet, but that online transactions accounted for up to 50% of their disputed charges. Recent reports state that "one in five online buyers has reportedly been a victim of Net-related fraud . . . according to a National Consumers League survey." The National Consumers League reported that between 1997 and 1998 there was a 600 percent increase in reports of Internet fraud.

Credit card transactions present various significant risks to the merchant. These include:

Loss of Payments & Merchandise

Online fraud presents the risk of huge revenue losses to Internet merchants. When fraud occurs, both the payment and the merchandise are gone. When consumers use credit cards in person and fraudulent transactions occur, issuing banks reimburse cardholders. Thus, if a cardholder's card is lost or stolen and then used by another fraudulently, it is the issuer that must absorb fraudulent charges, as federal law limits the cardholder's liability. This is because when a card is presented in person, the merchant does not have liability for fraudulent charges.

With Internet commerce, however, the merchants, not the banks, must reimburse issuers for 100% of the fraudulent purchases. Regulations created by Visa, MasterCard and other card issuer associations specify that in card-not-present (CNP) situations, merchants assume the full risk of purchases made by credit card, regardless of authorizations made by issuing banks. Because CNP transactions are the standard for e-commerce, and because these transactions will continue to grow in volume, the current framework shifts the burden of these losses primarily to the merchants. Indeed, for large companies, which do all of their business over the Internet based on CNP transactions, this loss exposure can be in the tens of millions of dollars.

Beyond using a stolen credit card or fabricated card number, other types of fraud abound in the online purchasing arena. With Internet orders, it's easier than ever for customers to dispute charges. For example, a husband may make charges and deny them to his wife, who in turn calls the card issuer and fervently disputes their bill. Though these purchases are valid, the card company may decide in favor of their customer, and the merchant is responsible for the chargebacks. In addition, merchants are responsible for loss from disputed charges when customers claim non-receipt of goods, non-arrival of goods due to incorrect shipping addresses, or goods refused on delivery.

Loss from Shipping Charges

The charges for shipping physical goods are normally paid by consumers. When online fraud occurs, however, shipping charges become the responsibility of the online merchant—yet another hit in the merchant's profitability.

Loss from Human Intervention

Online merchants attempting to use parameter-based rules and negative files to determine credit card fraud often watch their administrative costs skyrocket along with the increased staffing needed for time-consuming fraud investigations.

Loss of Valued Customers

Poorly managed fraud-control systems can lead to decreased customer satisfaction resulting in lost revenues. Many online retailers burden their customers with lengthy and complex online-order forms in an attempt to minimize fraud, consequently resulting in unacceptably elevated order abandonment, as legitimate customers become frustrated, lose interest in pursuing their purchases, and flee to other vendors. In the same vein, worthy customers become insulted when inaccurate rules turn down their orders. Such customers often permanently migrate to other websites where they find better treatment. The misguided merchants then waste valuable marketing dollars attempting to replace the very customers they turned away.

Loss from Chargeback Fees

A chargeback is a charge levied onto a merchant for the amount of a purchase that has previously been charged onto a payment card, and has been successfully disputed by a customer. When a chargeback is processed, the merchant must pay a fee of $15.00 to 25.00. If the merchant disputes the chargeback and wants to re-present, or re-issue, the charge, an equivalent fee is billed to the merchant. If the card issuer again decides in favor of the customer and processes a second chargeback, the merchant is charged yet another fee, and this time the charge cannot be re-presented. The merchant can, however, arbitrate the charge, whereupon the issuing bank can charge an up-front, non-refundable fee of up to $50.00.

Loss from Chargeback Fines

In addition to paying a fee for each chargeback, issuing banks can levy fines on merchants having too many chargebacks. Typically 1.5-3.0% of the merchant's chargeback volume, such fines can range from a few hundred dollars per month, to $10,000 or even $100,000 per month, with fines escalating higher as chargebacks continue unabated.

Loss of Credit Card Privileges

The final blow—after months of escalating fines, if chargebacks exceed a small percentage of a merchant's overall credit-card sales, the merchant can lose the privilege of receiving payment through credit card issuers.

Limitations of Most Fraud-Risk Solutions

On-line retailers have been quickly implementing a wide range of fraud fighting techniques to combat this perplexing and ubiquitous problem. The technological level of Internet fraud solutions today is similar to where credit card issuers were in 1992, when the incidence of bankcard fraud exploded and was expected to reach US $1 billion by 1995.

Typical solutions that have been deployed include the use or rule sets and basic checks such as address verification.

Rule Sets

Rule sets use if/then logic that attempts to identify aberrant behavior using limited data, including negative file information. Rule sets are difficult to implement because there is no real predictive capability associated with them. Throughout the 1990's, banks issuing credit cards quickly determined that rule-based fraud approaches by themselves were ineffective because they:

Allow an unacceptable level of fraud to flow through

Have high false-positive rates, where numerous valid orders are turned away compared to the small amount of fraudulent orders detected Create a high volume of cases requiring human intervention Are difficult to manage Are slow to reflect new fraud situations Address Verification Service (AVS)

AVS was designed for mail and telephone orders (MOTOs), and many online merchants use AVS today because it is the only tool they have. AVS has no international fraud detection capability, is inconsistent in its results, and, while providing some value, it is not designed for online transactions, and is by no means considered a complete solution for Internet fraud detection and revenue optimization.

Accordingly, there remains the need to identify and prevent fraudulent credit card transactions occurring over public networks, such as the Internet.

In order to identify fraudulent consumer credit card transactions in an online environment (e.g., the Internet), it is desirable to create a profile for each buyer that summarizes the transactional behavior the buyer, preferably for as many of the buyer's Internet purchases as possible. Such a profile makes it possible to contrast a currently attempted transaction with the historical behavior pattern of the buyer to help ascertain the likelihood of fraud. Also, such profiles make it possible to identify a pattern of transactions that are individually benign, but in aggregate indicates a likelihood of fraud. Two examples make this point clearer.

Example 1: A buyer who normally buys only office supplies and airline tickets, and does so only during business hours, will have a profile indicating this behavioral pattern. If that buyer (or more specifically, someone purporting to be that buyer by using their credit/debit card number) were to purchase adult entertainment images at a late night hour, the likelihood of fraud—given the contrast of the transaction request and the established profile pattern—should be estimated as higher. In contrast, a buyer who regularly patronizes such merchants, would have that information in their profile, and the same transaction would appear less suspicious.

Example 2: A buyer, who normally transacts once a month, makes 10 transactions, at different merchants, in a 10-minutes span. None of the 10 transactions may be suspicious on their own, but once their accumulation is recognized within the profile, the suspicion level of the latter transactions will be accentuated. This example becomes more complicated, if two different credit cards numbers are used.

In order to create a profile of a consumer, it is necessary to identify transactions of that consumer in the data streams received from many different sources. In segregating transactions, a key is used to identify and distinguish transactions of one buyer from transactions of another. A key is said to be reliable if it identifies a unique buyer with a very low likelihood of multiple buyers being associated with the same key or multiple keys associated with the same buyer. The Social Security Number, for instance, is considered a very reliable key. The government, in issuing those numbers, goes to great length to minimize the likelihood of an individual being assigned multiple numbers or the same number assigned to multiple individuals. A key is said to be unreliable if the likelihood of multiple individuals sharing the same key or multiple keys identifying the same individuals is not very low. For instance, a person's name is an unreliable key. A person may spell their name in multiple ways (including nicknames), and multiple individuals may have the same name. Credit card numbers, postal addresses, email addresses, IP numbers, and phone numbers are additional examples of unreliable keys. U.S. Pat. No. 5,819,226 discloses the creation and use of profiles based on transactional behavior. However, as disclosed this system assumes that each buyer uses the same credit card for each transaction, and thus transactions by the same buyer can be identified on the basis of the credit card number alone.

It is a fact of the Internet marketplace that there is no single reliable key that all buyers have and that is required to complete all transactions. For example, while SSN maybe highly reliable, it is not used in credit card purchases. Instead, at best a multitude of unreliable keys that are frequently required (name, address, phone number, etc.). The lack of a single reliable key is a fundamental problem with any effort to create a buyer's profile that tracks transactions at occur at multiple merchants and with different credit or debit cards. This is because each merchant independently decides which information about buyers to require and how that information is recorded, encoded, and organized. Even the same information required by different merchants (e.g., name) may end up being different in form; for example one merchant may truncate names over a certain length while other merchants do not. This means that there is no simple way to identify the various transactions made by the same buyers as such merely by matching individual keys (e.g., matching name and address fields).

Accordingly, it is desirable to provide a reliable way of identifying and aggregating transactions of individuals in order to build profiles of consumers for application to predictive modeling.

SUMMARY OF THE INVENTION

The present invention aids merchants by detecting Internet credit card transactions that are likely to be fraudulent, and optionally providing the merchants with mechanisms for managing a suspected transaction as it occurs. While the primary discussion herein focuses on credit card transactions, the principles of the present invention are equally applicable to debit cards, ACH transactions, micropayments, and other types of transactional mechanisms employing identification numbers as well, and thus no limitation to credit cards is intended.

A fraudulent transaction is one where the buyer supplies a credit card number without being an authorized user/cardholder (for instance, a stolen card number). The financial responsibility for such a fraudulent transaction rests with the merchant who accepted the credit card number in payment. Accordingly, by identifying fraudulent transactions as they occur, the present invention enables merchants to reduce their exposure to these types of losses.

In one embodiment, a buyer, transacting through the Internet, requests the purchase of certain goods from a merchant operating on the Internet and submits a credit card number as a form of payment. The Internet merchant forwards to at least one centralized scoring server relevant information about the requested transaction including identifying information about the buyer (e.g., name, shipping address, Email, IP address, credit card number, etc.) and about the transaction (e.g., amount, items ordered, clickstream through the web site prior to the purchase, etc.). The scoring server performs a mathematical calculation designed to estimate the likelihood that the transaction is fraudulent. That calculation takes advantage of information intrinsic to the transaction, information about other transactions that the same buyer has been making elsewhere (e.g., at other e-commerce sites and optionally at non e-commerce sites) and reported to the scoring server, and the contrast between this transaction and a profile established with respect to these prior activities. The estimation, in the form of a score, and optionally reasons for the score, special situation reports, and rules exceptions; is returned to the Internet merchant. The Internet merchant then decides whether to approve, decline, ask for more information, out-sort to a human analyst, or take other actions with respect to the transaction using the fraud estimation.

The scoring server performs its fraud estimation using a statistical model of fraudulent transactions. Historical data is collected to enable the creation of the fraudulent transaction model. The historical data contains the same types of information that merchants, in the operational system, transmit to the scoring server for each transaction. In addition, the historical data is tagged to identify which transactions subsequently proved to have been legitimate, and which subsequently proved to have been fraudulent (i.e., a supervised learning model). The historical data, excluding the fraud tags, is used to create the buyer profiles. A profile is created for each buyer who transacted at a subscribing Internet merchant.

The identification of the association of the various transactions with their respective buyers is done using a multi-keyed algorithm. The multi-key solution stems from the observation that while no one, universally required, key (e.g., last name, or address) is reliable, many keys together provide a probabilistic identification. Between them, multiple individually unreliable keys provide a higher-degree-of-accuracy probabilistic identification than any one key alone. Since an overall online fraud detection system may be designed to produce a statistical result, a probabilistic identification is sufficient—so long as the available information is contained within it. The multi-keyed algorithm accumulates and profiles transactional information with respect to different keys that can be used to identify a buyer. Each buyer's profile contains information summarizing the progression of transactions the buyer has executed over the Internet, including information typifying those transactions (typical amounts, types of purchase, type of merchants, hours of day, etc.). A self-learning computerized system is then used to train a statistical model to estimate the likelihood of fraud, in the historical data, of a given transaction given the information contained in the transaction as well as the state of the profile of the buyer in that transaction at the time the transaction is executed.

Transactions received at any participating merchant are forwarded to the statistical model for evaluation. The various profiles corresponding to the different keys of the transaction, along with the current transaction information is input into the model; the model provides an estimate of the likelihood of fraud. The merchant can then process the transaction based on this estimate, by either approving, declining, or out-sorting the transaction, or requesting additional information from the purchaser.

These features are not the only features of the invention. In view of the drawings, specification, and claims, many additional features and advantages will be apparent. The specification describes the invention for readability and instructional purposes. It does not limit the invention. A review of the claims is necessary to determine the invention.

The figures depict a preferred embodiment of the present invention for purposes of illustration only. One skilled in the art will readily recognize from the following discussion that alternative embodiments of the illustrated structures and methods may be employed without departing from the principles of the invention.

DETAILED DESCRIPTION

Overview of System Architecture

The present invention is described herein with respect to one preferred embodiment which is called "eFalcon" for purposes of reference and identification. It is understood that the present invention may be embodied in other forms and configurations other than the exact specifications and features of eFalcon as described in this specification.

Figure 1:
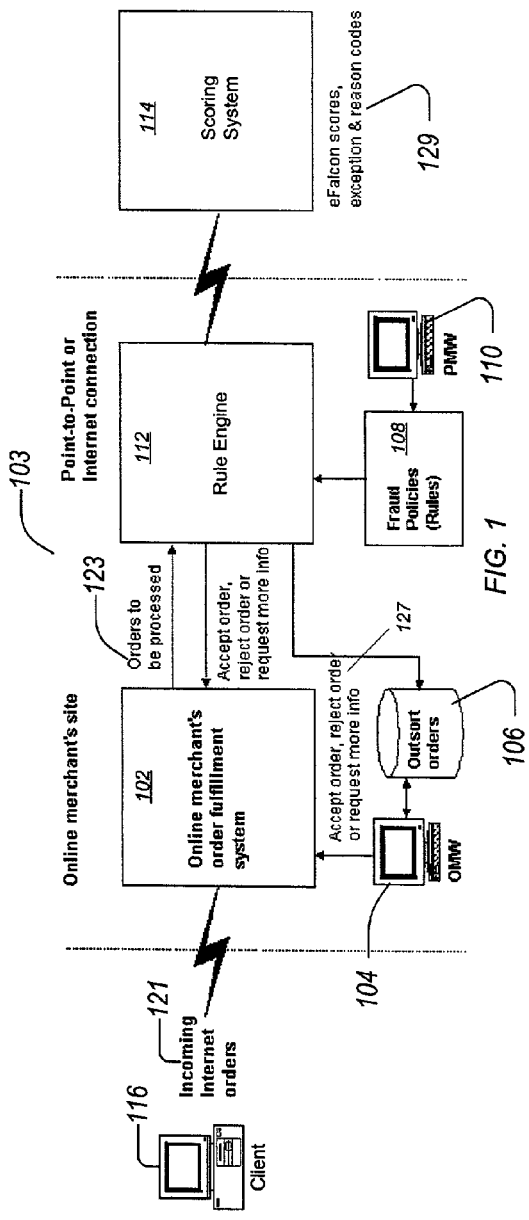
FIG. 1 illustrates of a system in accordance with one embodiment of the present invention.

Referring now to FIG. 1, there is shown an illustration of an embodiment of one eFalcon system that operates in accordance with the present invention. Here, eFalcon system 100 includes a merchant web site 103 and a scoring system 114; these are communicatively coupled either by a point-to-point connection (e.g. dedicated T1 line) or any other Internet type connection. The merchant web site includes an order fulfillment system 102 that receives incoming orders 121 via the Internet from client computer 116 (only a single client computer 116 is shown, but in practice there are many individual client computers 116 operating). The orders 121 may contain standard types of product or service order information (e.g. product code and other attributes of a product being ordered) and along information identifying the purchaser, (e.g., name, shipping address, e-mail address, IP address), and along with a payment identifier, such as a credit card number. The orders 121 may alternatively (or additionally) be received via mail or telephone, and then interfaced appropriately to the fulfillment system 102. The order fulfillment system 102 forwards orders to be processed to a rule engine 112. The rule engine 112 forwards this information to the scoring system 114 as a scoring request. The connection between the rule engine 112 and the scoring system 114 is preferably secured (e.g. SSL) given the highly confidential information contained in the transaction, purchaser, and payment information.

The scoring system 114 analyzes the provided information in the scoring request and estimates the likelihood that the transaction is fraudulent. In generating this estimate, the scoring system 114 matches information about the purchaser derived from the scoring request with information about other transactions that are most likely made by the same purchaser elsewhere (e.g. at other e-commerce sites and optionally at non e-commerce sites) to obtain an overall profile of the purchasers historical buying behavior. More specifically, multiple profiles corresponding to different key values derived from the scoring request are obtained and used by the scoring system 114. The profiles provide summaries of historical transactions for the individual(s) associated with the profile. In one embodiment, every transaction received from a merchant is used to update the profiles associated with that transaction.

The scoring system 114 includes one or more predictive models of fraudulent transactions. The profile(s) and the current transaction information are input into the predictive model(s) to produce the estimated likelihood of fraud. A predictive model is preferably a statistical model of fraudulent transactions. Multiple models may be used, with a particular model being employed for scoring a transaction depending on various transaction attributes, such as product type, merchant category code, or the like. The predictive model is derived from historical data containing the same types of information that merchants, in the operational system, transmit to the scoring system 114 for each transaction. In addition, the historical data is tagged to identify which transaction subsequently proved to have been legitimate, and which subsequently proved to have been fraudulent (i.e., a supervised learning model). The historical data, excluding the fraud tags, is used to create the various key profiles. A profile is created for each buyer who transacted at a subscribing merchant; key profiles for different keys are also created. The estimation, in the form of a fraud score, reasons for the score, special situation reports, and rules exceptions is returned to the merchant's rule engine 112. In one embodiment, the fraud score is a scaled scored between 1 and 999, though certainly other scales may be used.

Figure 2:
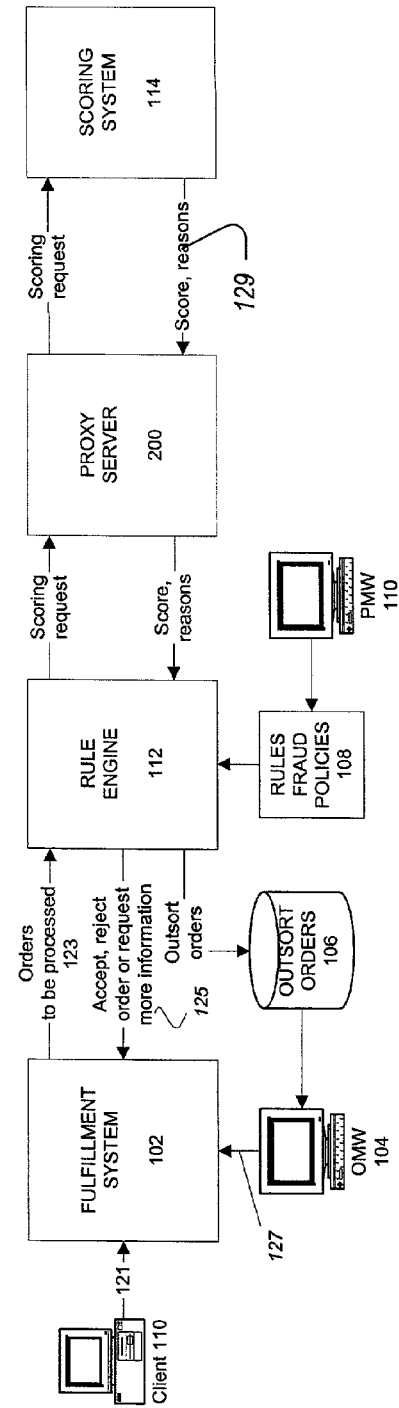
FIG. 2 illustrates of a system in accordance with one embodiment of the present invention using a proxy server.

The scoring system 114 operates in a service bureau or application service provider model, and may contain multiple servers operating in parallel to ensure high speed scoring of transactions from many different vendors. In one embodiment, as shown in FIG. 2, a proxy server 200 operates between the rule engine 112 and the scoring system 114. The proxy server 200 is used preferably by an Internet merchant service or commerce infrastructure provider, typically supporting multiple merchant sites 103. In this embodiment, the proxy server 200 acts as a conduit, by receiving the scoring requests from the merchant sites 102, delivering them to the scoring system 114, and then receiving the scores from the scoring system 114, and returning them to the requesting rule engines 114.

The rule engine 112 implements various rules 108 that establish its policies for dealing with fraudulent or potentially fraudulent transactions.

Given the fraud score for the transaction, the merchant's rule engine 112 perform 127 various actions, including:
  Accept order
  Reject order
  Outsort order
  Display web page requesting further information from the buyer
  Add order data to negative files for future use.

The merchant defines rules 108 that apply the foregoing actions as desired, based on the fraud score. The rules 108 are defined and updated using a policy management workstation (PMW) 110. The PMW allows the merchant to write policies formulated as computational rules that become active within the rule engine 112, integrating a real-time decision making process into the merchant's order fulfillment system 102. The PMW allows the merchant to define, edit, delete any rules it desires. The use of the rules enables the merchant's fraud-risk prediction system to automatically determine actions based on the fraud scores, order data and information from external sources, and to incorporate information from the negative files that the merchant may have already accumulated. The use of rule bases (rule sets) 108 releases the merchant from the limitations of using a binary Yes or No to determine the action to take on the fraud score.

One embodiment of the eFalcon system operates as described using the rule engine 112 and the PMW 110. A more sophisticated embodiment includes the order management workstation (OMW) 104, as illustrated in FIG. 1, which is used to handle out-sorted orders. The out-sorted orders are those that are neither immediately approved nor declined (e.g. in the 'gray'). The out-sorted orders 106 are stored in a file system (and may be sequenced for handling), where an operator using the OMW 104 can review each order and decide what further action to take in order to finally dispose of the order. The OMW 104 displays order, customer and merchant information for individual transactions. Having detailed order information helps representatives determine which orders are likely to be fraudulent. OMW 104 users can view a variety of data, such as customer name and address, and details about order items. Users can also see any previous activity on the order, and enter comments. Thus, the OWM is used for control and manipulation of orders being processed, so as to fulfill as many orders as possible, while avoid the risk of fraudulent orders.

After reviewing the data, the representative can determine whether the order is fraudulent, and decide to hold, accept, or reject the order. The OMW 104 also allows the merchant to specify the reason for the decision, such as non-sufficient funds (NSF, applicable to ACH), or an anonymous email address. If a representative wants to accept an order immediately, without reviewing the data (for example, if the order is placed by a known good customer), an OMW Accept Order option processes the order with no further action required.

In addition to review functions, the OMW 104 enables supervisors or other authorized personnel to create queues, add new users to the OMW 104, and perform other administrative tasks. Queues are tools that group orders according to like characteristics (for example, orders over two thousand dollars) and direct those orders to specific representatives for review. The system gives the merchant the ability to define and create queues according to user-specified criteria. This queue definition feature gives the merchant the ability to control and direct workflow. Through the use of queues, administrators select the type of orders that go to each representative, making the most efficient use of available resources. If no queues are specifically defined, default queues determine the sequence in which orders are presented. Once a queue is defined, it may be assigned to one, multiple, or all representatives.

The present invention differs from conventional approaches to merchant situated fraud detection in various ways. In one regard, it does not look at each transaction on its own, but instead contrasts the totality of behavior of a buyer across all (subscribing) merchant sites. This allows for a more accurate profile of the overall purchasing behavior of the buyer, since it considers transactions at multiple merchants. This is only possible with the use of consolidated transactional information from many merchants and only if the problem of identifying transactions of a buyer across a multitude of sites is resolved, since it is necessary to accurately identify which transactions belong to which buyers at the multiple sites. Also, this method uses information not typically supplied with credit card authorization data (for instance, information about specific orders such as product identifying information) and not traditionally used in fraud control. Conventional authorization based fraud control typically used just the merchant information, buyer information and the amount of the transaction—but not details about the items being purchased. Item information is useful here to create a more complete picture of the types of products and services each buyer typically purchases over the Internet.

Multi-key Identification of Purchasers

Figure 3:
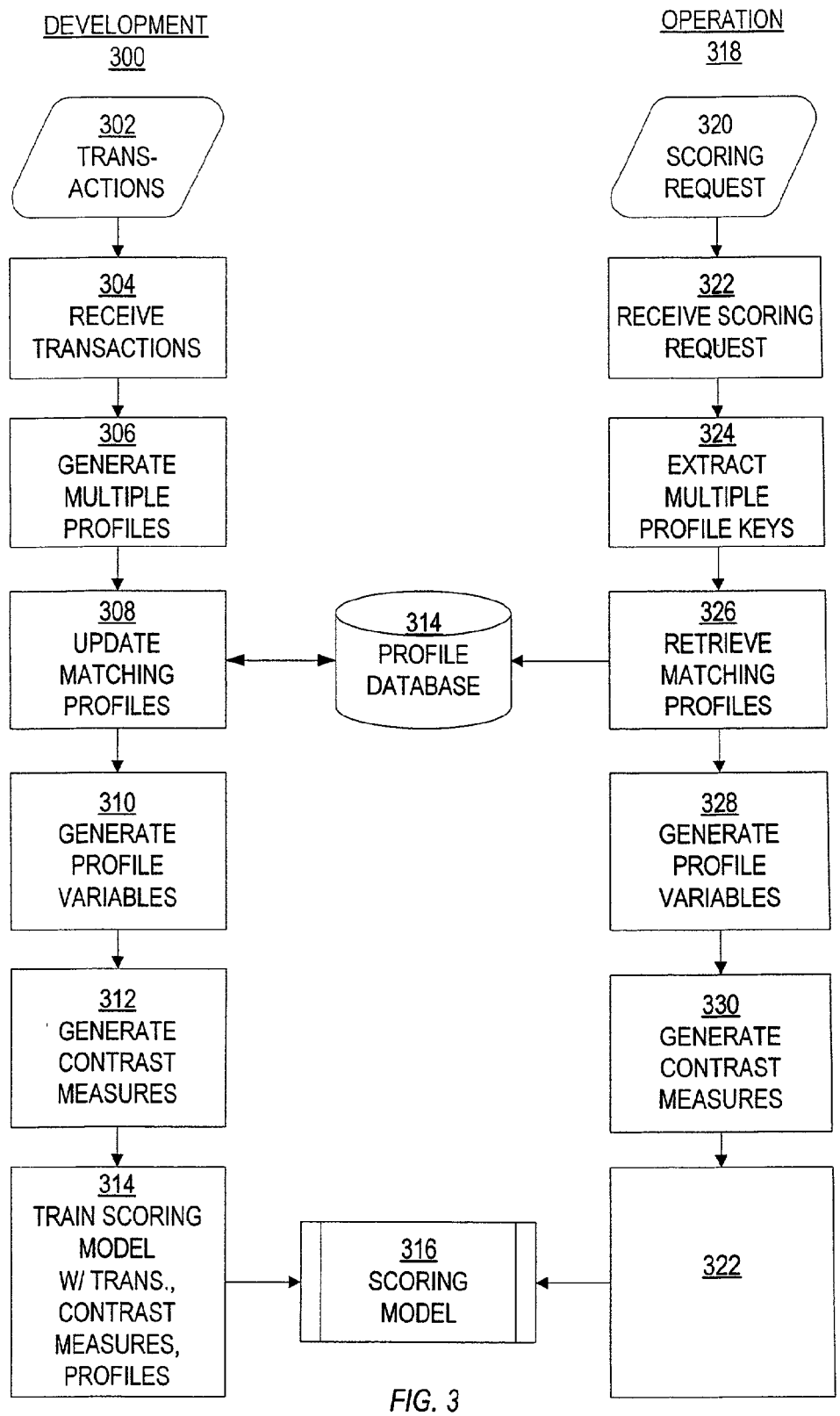
FIG. 3 is a flowchart of the development and production environments.

As noted above, in order to accurately determine whether a given transaction of a purchaser is fraudulent, it is desirable to compare that transaction with prior transactions of the purchaser. However, accurately matching the purchaser identified in a given scoring request with data of known purchasers is difficult because of the vagaries, irregularities, and inconsistencies typically observed in purchaser information in online environments. In one embodiment, the system described above overcomes the problem of purchaser identification using a multi-key approach. FIG. 3 illustrates a sample embodiment of the eFalcon system using this approach, considering both the development and production environments.

Generally, to provide a multiple-key solution, a number of unreliable or not perfectly reliable key fields are selected for both training and production use. In one embodiment, these fields include:
Name
Shipping Address
Billing Address
Phone Number
Social Security Number
Email Address
IP Address Other keys that may arise in certain circumstances (such as frequent flier number, company name, company address or telephone number, fax number, account number, and like may also be used.

This information is collected 304 from many different merchants from transactions 302 conducted at these merchants' e-commerce sites. More particularly, a large number of transactions are accumulated from the many merchant sites. Optionally non-e-commerce transactions may also be used.

A profile is built 306 based on each key (at least individually), as if it was reliable. Thus, all transactions sharing the same name are profiled together, as are all transactions sharing the same address, and so on, for each of the selected individual keys. These profiles are stored in a profile database 314, in association with their specific key.

As result of the profiling of each key field, some profiles include information that pertains to multiple individuals and some profiles contain information that pertains only to some of the transactions of a specific individual. As an example of the former, a profile based on shipping address will capture all transactions to that address, at which there may be several individual cardholders. As an example of the latter, a profile based on IP address will capture transactions from a specific computer, but a cardholder may well use many different computers to make purchases (e.g., a home computer and a work computer).

In an optional embodiment, profiles based on combinations of keys may be generated 306. For example, combination keys may be defined such as:
name and address
name and email address
email address and IP address
email address, shipping address, and telephone number, and
any other combination of desired keys.

Consequently, each transaction is used to update 308 multiple profiles in the profile database 314. That is, the transaction will influence the transaction pattern of each profile for which it matches at least one key. Thus, a given transaction for which name, address, email address, and IP address is known, will be used to update at least four different profiles, one for each of these keys.

Variables are generated 310 from for each key (or combination key) profile. That is, transactional summary variables, such as averages, rates, total, frequencies of transactions, authorizations, declines, dollars, SIC codes, and so forth are generated from the transactions in each of the profiles. These profile variables are stored in their associated profiles. These variables usefully describe the historical purchasing behavior of the individual(s) contributing to the profile.

For certain pairs of these profiles and for certain variables in the profiles a contrast measure is computed 312. Preferably the contrast measure is the ratio of the profile variable value in the pair of profiles. The contrast measure provides a measure of how similar the profiles are to each other and thus how reliable they are in describing the buyer's transactions. The idea here is that if two profiles have very similar variable values, then they are most likely derived from the same set of transactions, and thus represent the same buyer.

Example: Suppose there is a "velocity" variable (any variable that measures the rate with which a buyer does something, such as execute transactions, make purchases, obtains authorizations or the like). There will then be a "transaction velocity" variable for each of the unreliable (or not-always-available) keys: "name profile transaction velocity", "email profile transaction velocity", etc. Thus if there are six keys of interest, then there are six transaction velocity variables. Likewise for any of the other variables in each profile for which a transaction velocity is desired. (Other rate variables may be measured as well, not merely transaction rate).

From here, the system can calculate, say, the contrast measure between various pairs of the profile "velocities." For example, a contrast measure may be computed for:
"name profile transaction velocity" and "email profile transaction velocity"; or
"email profile transaction velocity" and "telephone profile transaction velocity"

and so forth for whichever pairs have been determined (through model training and variable reduction) to provide useful inputs to the scoring model 316. While the contrast measures for each pair of profiles and for each variable in each profile may be used, in practice, the contrast measures for only certain pairs of profiles will be of interest, and others will likely not be useful. The determination is one made during model development. In addition, the contrast measures are not limited to ratios but other formulas may be used, such as the difference between to profiles. Also, the measures may be used to compare 3 or more profiles simultaneously.

For each pair, when using a ratio, the closer the contrast measure is to 1.0, the higher the confidence in the value provided by the two velocities contrasted for the specific transaction since it would be a remarkable coincidence for two velocities to be almost the same unless the transactions that went into each (and hence each profile) were nearly identical. Identical profiles likely means identical entities, e.g. purchasers, associated with these profiles, and thus accurate identification of the purchaser. Obviously, if using the difference as the contrast measure, then closer the measure is to 0.0, the more likely the profiles are for the same purchaser.

Finally, to train the scoring model 316, each transaction, its associated set of key profiles, and the contrast measures are input in a supervised learning environment. The contrast measures allow the scoring model 316 to weight the influence of the different key profiles in terms of their reliability for fraud prediction. In this way, absolute accuracy in matching up profiles with a particular buyer during operation is unnecessary, since the scoring model 316 appropriately weights more "accurate" profiles to increase their influence in describing the buyer's transaction behavior. The scoring model 316 may be developed with standard statistical computer-learning packages, such as SAS, the HNC Data Mining Workstation, S+, or the like. Once developed, it is deployed within the scoring system 114.

In one embodiment, the scoring model 316 is one or more neural networks. Neural network scoring is effective for fraud and risk assessment because of its ability to observe patterns and detect the slightest behavior anomalies. Criminals normally make fraudulent transactions to purchase items easily converted into cash. The behavior displayed in using a bankcard for Internet fraud is fairly specific, and varies from the typical way consumers make transactions. Consumer transactions normally have the following detectable patterns:

They occur at a certain rate over time
They are made within a certain geographic region
They are limited to certain types of items
They are made at certain times of the year Through the use of the profiles during model training, the scoring model 316 learns what patterns of transactions are indicative of non-fraudulent and fraudulent behavior, taking into account what behavior is normal in an account, as described by each consumer's profile. What looks normal for one account may be flagrant fraud for another account. For example, if a consumer only uses his credit card in the evenings to buy computer equipment from an online electronics outfit, then a charge on this same credit card for a case of Vodka from an online merchant at 10 a.m. looks suspicious. However, this same charge appears more reasonable for many other accounts, which have a history of early morning purchases at liquor merchants. Typically, the score for a transaction is high for orders appearing abnormal, and especially high for orders that both appear abnormal and similar to some pattern of fraudulent activity.

In general, there are three categories of information that the scoring model 316 models: the general characteristics of fraudulent orders, individual cardholder behavior and normal customer behavior at the merchant's site. Each of these contributes important variables to an evaluation of the likelihood of fraudulent activity. While methods of perpetration of fraud change frequently, the basic criminal behavior and activity with fraudulent cards is slow to change. As a result, the scoring system 114 contains both dynamic and static components. The dynamic components include "reasonable and customary" account models updated in real-time with each order. The static components include the fraud behavior models maintained and updated as fraud behavior changes, or as increased prediction accuracy is achieved. The scoring model 316 is developed by using historical transaction and account information from as many different card issuers and other transaction information sources as possible, which is known as "consortium data."

In the operational environment 318 then, the flow is very similar to that described above. A scoring request for transaction 320 for a transaction is received 322. The information corresponding to the profiled keys is extracted 324, for example, the buyer's name, address and so forth (if such information is available). The matching profile for each key is retrieved 326 from the profile database 314.

For example, if the transaction information contains the following:

Name: John Public
Address: 123 Main Street, Belmont, Calif.
Telephone: (650) 599-3929
Email: jpublic@network.com
IP address: 121.080.212.121

Then the profiles corresponding to the value of each of these keys are retrieved. Thus, the profile for the string "John Public", and for the address "123 Main Street, Belmont, Calif." and so on are each obtained 326.

Any profile variables that are dynamic are generated 328, and the appropriate contrast measures between selected ones of the profiles are also computed 330.

The current transaction information is then input into the scoring model 316 for scoring 332, along with the various profiles associated with each of the individual key values (or combinations), and the contrast measures (which act to weight the profiles). The scoring model uses this information to compute the fraud score. This output fraud score is returned to the merchant's rule engine 112.

In an alternative embodiment, instead of all profiles being input in the scoring model 316, certain profiles are selected for input prior to scoring based on their contrast measures, such as selecting those profiles whose associated contrast measures are above a certain threshold.

Scoring System

A suitable scoring system 114 for scoring transactions, and for storing a model of fraudulent transactions is the Capstone Model Manager, which may be purchased from HNC Software, Inc. of San Diego, Calif.

In one embodiment, the scoring system 114 includes a model manager, a scoring model 316, and a profile database 314. The model manager is used to develop the scoring model 316. Model development begins with data pre-processing. This stage is handled by a model manager driver. During this stage raw data, such as the historical transactions, is converted by the driver into variables for the model development data set.

The desired variables are first defined using a modeling language (such as the Capstone Model Manager Language) to define and calculate all variables that may be used in the model. Defining the variables in separate files (based on variable categories) and then including them into the main model can further localize the variables. This modularizes the model development process and logically separates it from any expert rule bases that are also being employed. In this embodiment, the defined variables will include the desired transaction summaries to be calculated for each profile (e.g. the velocity measures discussed above), along with the contrast measures for selected sets of profiles.

Once all the variables and their associated calculations have been defined, (along with other ancillary code) the modeling data set is generated. This is done by feeding the raw data through a modeling driver, which performs the defined calculations on the data, and then uses an output functions to write out the values of the calculated variables to a designated file.

Once the modeling data sets have been generated, the modeler can now perform statistical analysis using standard tools like SAS, S-Plus or HNC's Marksman. These tools can be used for variable selection and model building. The completed model preferably is a statistical model, e.g., a neural network or regression model, but may also include rules for further transaction processing. One example of a statistical model is described in U.S. Pat. No. 5,819,226, which is incorporated herein by reference. As mentioned above, this approach uses one or more profiles of each consumer's historical spending behavior, to determine whether a particular transaction presented by the consumer is aberrational.

The model manager includes a rule editor for editing model rules, and a model driver that accepts the raw input data and calculates variables for model development. Rules may be used to execute variable calculations, flow control and data manipulation. Rules are extremely useful in creating expert systems or to control model inputs and outputs. For example, rules may be written to flag transactions with certain attributes (e.g. very high transaction amount).

The model may also include functions and calculations. Functions are very similar to rules, except that they take arguments and return values. Calculations may be performed within rules or functions, or within variable calculation blocks. A variable calculation block includes a variable declaration followed by the method by which the variable is to be calculated. In addition variables calculations can be logically grouped together so that at execution time, all variables within a group can be calculated via a single function call.

As noted above, scoring system 114 includes a profile database 312. As previously explained, this database will store profiles related to different keys derived from the historical transactions, which profiles are then used in model development, e.g. as the source of the variables, contrast measures, and the like. It is important to note that the transactions used here in model development come at least in part from a variety of different merchants, and are not limited to transactions from single merchant. This gives the model a robust set of transactional data that best approximates the purchasing behavior of individuals, who shop at multiple merchants. The multiple keys allow for the reliable identification of an individual as that individual transacts at multiple merchants. Hence, the multiple key profiles summarize an individual's transactional behavior across multiple merchants.

Merchant System

The merchant system 103 includes the fulfillment system 102, the rule engine 112, the OMW 104, the PMW 110, and their associated data stores, the outsorted orders 106 and fraud policies 108. The fulfillment system 102 may be any type of online ordering system that supports conventional product ordering process flow, such as providing a catalog of available products, order forms and scripts for receiving product information and purchaser information, and any other business logic that the merchant desires. It is preferably that the fulfillment system 102 capture sufficient information to basically identify the purchaser, as indicated above; otherwise, there is no constraint imposed on the features of the fulfillment system 102 by the present invention.

The rule engine 112 operates on a conventional computer system, such as a Sun Microsystems's UltraSparc™ or Intel Pentium™ class computer, executing a conventional operating system, such as Sun Microsystems's Sun Solaris or Microsoft Corp.'s Windows NT. The rule engine 112 is coupled to the scoring system 114 by either a convention Internet connection or by a point-to-point connection, such as an ISDN or T1 line, or frame relay.

Rule Engine

The rule engine 112 interfaces between the fulfillment system 102 and the scoring system 114. The rule engine 112 includes modules that receive transactions from the fulfillment system 102, provide the scoring requests to the scoring system 114, and then apply rules 108 to the scored transactions. The interface to the scoring system 114 is provided by a client application programming interface (API) that provides various function calls to the rule engine 112.

API to Scoring System

The scoring system 114 provides an interface (API) that enables the merchant to link the rule engine 112 to the scoring system 114, such as through the proxy server mentioned above. The calls are made to a shared object library on a Sun Solaris, Linux or HP-UX platform; other platforms may be used as well. The library functions provide connection and scoring invocation services.

The API library supports both synchronous and asynchronous scoring by the scoring system 114. In asynchronous mode, the API returns immediately to the calling application when a scoring request is made. In synchronous mode, the API does not return until the scoring system 114 has returned the score, or a timeout has occurred.

The API library provides fully redundant connectivity between the rule engine 112 and the scoring system 114. This is provided through multiple point-to-point connections such as direct network connectivity, T1 lines, or Internet access. Failover is handled automatically by the library. The redundancy is completely transparent to the applications programmer using the API.

Communication between rule engine 112 and the scoring system 114 is provided by the passage of messages across the communications interface. The API library provides a series of function calls permitting application programmers to build messages for the scoring system 114 by concatenating a series of fields. When message building is complete, the application programmer sends the message by invoking another API function.

Table 1 below provides a description of the function calls in one embodiment of the API.

TABLE 1

Summary of Client API Function Calls

| Call | Description |
| --- | --- |
| AllocHandle | Allocates memory for and returns a pointer to an Handle_t, an internal handle structure used by the API functions. It returns NULL if the function is unable to allocate the necessary memory. |
| ClearDefaultField | Clears the contents of the specified default order field from the current thread. |
| ClearDefaultFields | Clears the contents of all default order fields from the current thread. |
| ClearField | Clears the contents of the specified order field from the current thread. |
| ClearFields | Clears the contents of all order fields in the current thread. |
| Connect | Initializes the connections between the merchant's e-commerce application software and the scoring system 114. Returns an Error_t code reporting the status of the function. |
| ConnectionStatus | Returns an Error status for the specified connection |
| Disconnect | Closes the connections between the merchant's e-commerce application and the scoring system 114. Returns a value of Error_t type when completed. |
| FreeHandle | De-allocates Handle_t memory allocated by a previous call to AllocHandle. |
| GetDefaultField | Gets the default value of a field in an order message that may be transmitted to the scoring system 114. Returns a value of Error_t type when completed. |
| GetDefaultFields | Gets the default values of fields in order messages transmitted to the scoring system 114. Returns a value of Error_t type when completed. |
| GetErrString | Returns a free text error string describing an error in more detail. |
| GetFD | Returns an array of file descriptors that can be used by the calling application to block processing until data is ready to be retrieved. |
| GetField | Gets the contents of the specified order field from the current thread. |
| GetFields | Gets the contents of all fields of the order in the current thread. |
| GetResponse | Retrieves the next response message from the scoring system 114. If there is no response message it returns with the Response parameter set to NULL. Returns a value of Error_t type when completed. |
| GetStatistics | Retrieves the statistics associated with the current Handle_t. |
| Send | Transmits data accumulated from a series of SetField and SetDefaultField calls to the scoring system 114. Successful completion resets the fields of the current order to their non-populated values, so the next order can populate the fields via SetField calls. Returns a value of Error_t type when completed. |
| SetDefaultField | Populates default values for fields in order messages transmitted to the scoring system 114. Returns a value of Error_t type when completed. |
| SetDefaultFields | Populates default values of fields in order messages transmitted to the scoring system 114. Returns a value of Error_t type when completed. |
| SetField | Populates fields in an order message for transmission to the Service Bureaus. Certain fields within the message require use an Index argument because any number of field groups can be filled in the order. Returns a value of Error_t when completed. Note: When a call is made to Disconnect and the connection has never been established, error code "Other" is returned instead of a timeout or not connected error message. |
| SetFields | Populates fields within an order message for transmission to the Service Bureaus. |

As discussed above, FIG. 3 illustrates the general processing flow for the rule engine 112 to pass a scoring request to the scoring system 114. This processing flow is discussed now is more detail, with reference to various ones of the API functions used.

Generally, in calling the scoring system 114, the calling application (which is typically the rule engine 112 but ostensibly can be any application that has access to the data of a transaction and to the API) requests allocation (AllocHandle) of a handle for a threaded connection to the scoring system 114, and then requests connection via the handle to the scoring system 114 (Connect). Given the handle then, the calling application forms a scoring request by setting a number of data fields using data from the transaction (SetField, SetDefaultField, SetFields, SetDefaultField, ClearField, ClearDefaultField, ClearFields, or ClearDefaultFields).

The fields are set as (name, value) pairs. While these fields are illustrative, not all are mandatory. Also, while a scoring request is being constructed, the calling application can query the request to obtain field data (GetField, GetDefaultField, GetFields, or GetDefaultFields). The calling application then sends the scoring request via the provided handle to the scoring system 114 (Send).

The calling application then separately requests the scoring result from the scoring system 114 (GetResponse). This call is responded to as the scoring system 114 as it becomes available. The calling application then disconnects (Disconnect) from the handle to close the connection to the scoring system 114. A multi-threaded implementation would create multiple threads at once, with a handle for each thread, and define a scoring request in each thread.

Table 2 describes the various different fields that may be used to define a scoring request:

TABLE 2

Summary of Scoring Request Fields

| Field | Description | Format | Indexed? |
|---|---|---|---|
| ABA | The bank ABA routing number (only allowed when PAYMETHOD = A) | Char (9) | No |
| ACCTEXPDT | Expiration date from cardholder file. | Date ccyymmdd (8 bytes) | No |
| ACCTTYPE | The account type for ACH transactions (only allowed when PAYMETHOD = A) C = Checking S = Savings | Category | No |
| ACHRESPONSE | Uses predefined ACH codes. | Category | No |
| AUTHAMT | The amount requested for authorization. | Numeric (12.2) | No |
| AUTHDECISIONCD | Authorization or posting: Approve/decline code: A = Approve D = Decline I = Approve with positive ID P = Pick up card R = Reref C = Reref continuously Payment: Payment type: B = Balance transfer C = Check E = EFT I = Internal transfer W = Cash K = Convenience check O = Other | Category | No |
| AUTHDT | The date of the authorization request | Date | No |
| AUTHPOST | Text (1 byte) Type of transaction: A = Authorization P = Posting Q = Payment N = Nonmonetary (nonmon) | Category | No |
| AUTHPOSTCD | Authorization or posting. Transaction type: C = Cash M = Merchandise K = Convenience check T = Balance transfer R = Crediting the account V = Reversal A = Address verification X = Cancel transaction B = Merchandise with cash back S = Code 10 merchant suspicious All credit models score C and M transactions; some score K and B transactions. Returns a no-score error for unscored authorization and posting types. Payment. Payment method: A = ATM T = Teller window P = Postal R = Account transfer D = Drop box O = Other C = Computer self payment/self transfer B = Phone self payment/self transfer payment models score all payment transactions. | Category | N |

TABLE 2-continued

Summary of Scoring Request Fields

| Field | Description | Format | Indexed? |
|---|---|---|---|
| AUTHPOSTCD (cont.) | Nonmon. Transaction type:<br>A = Address change<br>C = Change of PIN<br>F = First issue of PIN<br>K = Request for checks<br>L = Credit-line change<br>P = Phone number change<br>N = Name change<br>O = Other request<br>Q = Card reissue (requested)<br>R = Card reissue (normal)<br>I = Add cardholder<br>1-9 = User-dined data<br>M = Mother's maiden name change<br>S = Social security number change<br>X = Automated inquiry transmission | Category | N |
| AUTHRESP | The authorization response<br>00 = Auth approved and completed<br>01 = Referral<br>03 = Invalid Merchant<br>04 = Pickup<br>05 = Decline<br>08 = Honor with ID<br>12 = Invalid transaction<br>13 = Invalid amount<br>14 = Invalid card number<br>15 = Invalid issuer<br>30 = Format error<br>41 = Lost card<br>43 = Stolen card<br>51 = NSF credit<br>54 = Expired card<br>55 = Invalid PIN<br>57 = ISSCH not permitted<br>58 = ACQMER not permitted<br>61 = Exceeds withdrawal limit<br>62 = Restricted card<br>63 = Security violation<br>65 = Exceeds count<br>75 = Exceeds PIN retries<br>76 = Invalid to account<br>77 = Invalid from account<br>84 = Invalid life cycle<br>85 = Not declined<br>91 = System unavailable<br>92 = Unable to route<br>94 = Duplicate<br>96 = System error | Category | No |
| AUTHTM | The time of the authorization request | Time | No |
| AVAILCREDIT | Authorization, posting, or Nonmon: Credit line at time of this transaction Payment: Balance after this transaction | Numeric ± nnnnnnnnn (10 bytes) | No |
| AVSRESPONSE | The response to AVS request:<br>A = AVS_ADD_ONLY<br>G = GLOBAL<br>N = AVS_NO_MATCH<br>R = AVS_SYS_UNAVAIL<br>S = AVS_NOT_SUPPORTED<br>U = AVS_NO_DATA<br>W = AVS_ZIP_NINE<br>X = AVS_EXACT<br>Y = AVS_ZIP_FIVE_ADD<br>Z = AVS_ZIP_FIVE_ONLY | Category | No |
| BILLADDRESS2 | A second billing address line. | Char (30) | No |
| BILLAPT | The apartment/ suite number for billing | Char (6) | No |
| BILLCITY | The city for billing | Char (30) | No |
| BILLCOUNTRY | The country for billing, expressed using numeric ISO country codes | Category | No |
| BILLSTATE | The state for billing; expressed using state codes | Char (10) | No |
| BILLSTREET | The street address for billing | Char (30) | No |
| BILLZIPCD | The postal code for billing | Char (9) | No |

TABLE 2-continued

Summary of Scoring Request Fields

| Field | Description | Format | Indexed? |
|---|---|---|---|
| CARDBRAND | Issuer card type:<br>S = Standard<br>P = Platinum<br>C = Secured<br>G = Gold<br>N = No-limit card | Category | No |
| CARDCNTRYCD | Cardholder ISO country code from cardholder file. | Category | No |
| CARDEXPDT | The expiration date on the credit/debit card in MMYY format | Char (4) | No |
| CARDNO | The payment card number expressed with numeric characters only | Char (19) | No |
| CARDTYPE | The card type used to make the payment<br>A = AMEX<br>C = CarteBlanche<br>D = Discover<br>E = Diners Club<br>J = JCB<br>M = MasterCard<br>V = Visa<br>P = Private Label<br>U = Other | Category | No |
| CARDUSE | Card use:<br>C = Business (corporate travel and entertainment)<br>S = Business (purchasing)<br>B = Business (small)<br>P = Personal | Category | No |
| CARRIER | The shipment carrier<br>F = Fedex<br>P = USPS<br>U = UPS<br>L = Purolator<br>G = Greyhound<br>D = DHL<br>O = Other | Category | No |
| CINPRESENT | The customer response to a merchant request for the card identification number (CIN):<br>0 = CIN_NOT_PROVIDED<br>1 = CIN_PRESENT<br>2 = CIN_PRESENT_NOT_LEGIBLE<br>8 = CIN_NOT_REQUESTED<br>9 = CIN_NOT_PRESENT<br>If the presence indicator is 1, the CIN code number should be sent to eFalcon. Otherwise one of 0, 2, 8, or 9 should be sent to eFalcon. | Category | No |
| CINRESPONSE | The response code from an issuing bank after the presence indicator CINPRESENT and (optionally) the customer's CIN value have been sent to the bank in an authorizatoin request. The response code is one of the following:<br>M = CIN_MATCH<br>N = CIN_NOMATCH<br>P = CIN_NOT_PROCESSED<br>S = CIN_MISSING_ON_CARD<br>U = CIN_ISSUER_NOT_CERTIFIED | Category | No |
| CORPADDRESS2 | A second corporate address line. | Char (30) | No |
| CORPCITY | The corporation's city, if a corporate purchase | Char (30) | No |
| CORPCOUNTRY | The corporation's country, if a corporate purchase, expressed using numeric ISO country codes. | Category | No |
| CORPFAX | The corporation's fax number, if a corporate purchase; expressed with numeric characters only | Char (12) | No |
| CORPNAME | The corporation's name, if a corporate purchase | Char (30) | No |

TABLE 2-continued

Summary of Scoring Request Fields

| Field | Description | Format | Indexed? |
|---|---|---|---|
| CORPPHONE | The corporation's phone number, if a corporate purchase; expressed with numeric characters only | Char (12) | No |
| CORPPONBR | The corporation's e purchase order number, if a corporate purchase | Char (15) | No |
| CORPPURCHASE | An indication of whether this is a corporate purchase<br>Y = Yes<br>N = No | Category | No |
| CORPPURCHDESC | The description of the corporate purchase | Char (160) | No |
| CORPSTATE | The corporation's state, if a corporate purchase; expressed using state codes | Char (10) | No |
| CORPSTREET | The corporation's street address, if a corporate purchase | Char (30) | No |
| CORPSUITE | The corporation's suite number, if a corporate purchase | Char (6) | No |
| CORPZIPCD | The corporation's postal code, if a corporate purchase | Char (9) | No |
| CREDLINE | Authorization, posting, or payment: Credit line at time of this transaction. Nonmon: New creditline for credit-line change; otherwise, credit line at time of transaction. | Numeric ± nnnnnnnnn n (10 bytes) | No |
| CURRCD | The currency code used for the order, expressed using ISO codes | Category | No |
| CURRCONV | Authorization or posting: ISO conversion rate from AUTHAMT currency to USD. | Numeric ±nnnnn.nn nnnn (13 bytes) | No |
| CUSTAGE | The age of the customer; acceptable values are 0-150 | Integer | No |
| CUSTBDATE | The birthdate of the customer | Date | No |
| CUSTCOOKIES | An indication of whether cookies are enabled on the customers PC<br>Y = Yes<br>N = No | Category | No |
| CUSTEMAIL | The email address of the customer | Char (60) | No |
| CUSTFAX | The fax number for the customer; expressed in numeric characters only | Char (12) | No |
| CUSTFIRSTNAME | The first name of the customer. Note: When the merchant cannot break a customer name into its first, middle and last name components, the entire name will be placed in the CUSTFIRSTNAME field of the order. If it is longer than 30 characters, the next characters, up to 30, will be placed in the CUSTOMERMIDNAME field, and any remaining characters are placed in CUSTOMERLASTNAME field of the order. The fields are then concatenated by the Scoring Server to retrieve the original name. | Char (30) | No |
| CUSTGENDER | Gender of primary cardholder.<br>M = Male<br>F = Female | Category | No |
| CUSTHOMEPHONE | The nighttime or home phone number of the customer; expressed with numeric characters only | Char (12) | No |
| CUSTID | The merchant's Site ID for the customer | Char (64) | No |
| CUSTIP | The IP address of the customer | Char (15) | No |
| CUSTLASTNAME | The last name of the customer | Char (30) | No |
| CUSTMAXAGE | The maximum age of the customer, if an age range is provided | Integer | No |
| CUSTMIDNAME | The middle name or initial of the customer | Char (30) | No |
| CUSTMINAGE | The minimum age of the customer, if an age range is provided | Integer | No |
| CUSTSALUTATION | The salutation for the customer, e.g. MR, MRS, MS, DR, REV, etc | Char (5) | No |
| CUSTSSN | The social security number of the customer | Char (12) | No |

TABLE 2-continued

Summary of Scoring Request Fields

| Field | Description | Format | Indexed? |
|---|---|---|---|
| CUSTTM | The time on the customer's PC | Time | No |
| CUSTWORKPHONE | The daytime or work phone number of the customer; expressed with numeric characters only | Char (12) | No |
| CVVVERIFYCD | Authorization or posting: CVV/CVC outcome:<br>I = Invalid<br>V = Valid | Category | No |
| DEFFORMFILL | The degree to which the form was filled automatically<br>E = All fields filled automatically<br>M = All fields filled automatically, but some fields modified manually<br>N = No fields filled automatically | Category | No |
| FORGOTPWD | Indicates if the customer forgot the account password and requested a new one<br>Y = Yes<br>N = No | Category | No |
| GIFTCARDTYPE | The type of card to send with a gift<br>1 = Celebrate Fall<br>2 = Grandparent's Day<br>4 = Independence Day<br>A = Anniversary<br>B = Birthday<br>C = Congratulations<br>D = April Fool's Day<br>E = Easter<br>F = Father's Day<br>G = Graduation<br>H = Holiday<br>I = Season's Greetings | Category | No |
| | J = Passover<br>K = Kwanzaa<br>L = Halloween<br>M = Mother's Day<br>N = New Year's Day<br>O = Bosses' Day<br>P = St. Patrick's Day<br>Q = Sweetest Day<br>R = Christmas<br>S = Baby Shower<br>T = Thanksgiving<br>U = Other<br>V = Valentine's Day<br>W = Wedding<br>X = Secretary's Day<br>Y = Chinese New Year<br>Z = Hanukkah | Category | No |
| GIFTMSG | The message attached to an order intended as a gift | Char (160) | No |
| HANDLING | The charge for shipping and handling | Numeric (12.2) | No |
| INCOME | Authorization or posting: Cash-back amount ISSUETRANTYPE = B (merchandise with cash back). Otherwise, annual income (zero if income data not available) Payment: Minimum due (amount to make the account current) Nonmon: Old credit line, for credit-line change | Numeric ±nnnnnnnn nn (10 bytes) | No |
| ITEMCARDATTACH | The customer wishes to send a card to the recipient along with an item intended as a gift | Y/N | Yes |
| ITEMCARRIER | The recipient's shipment carrier for an item<br>F = Fedex<br>P = USPS<br>U = UPS<br>L = Purolator<br>G = Greyhound<br>D = DHL<br>O = Other | Category | Yes |

TABLE 2-continued

Summary of Scoring Request Fields

| Field | Description | Format | Indexed? |
|---|---|---|---|
| ITEMGIFTCARDTYPE | The type of card to send with a gift:<br>1 = Celebrate Fall<br>2 = Grandparent's Day<br>4 = Independence Day<br>A = Anniversary<br>B = Birthday<br>C = Congratulations<br>D = April Fool's Day<br>E = Easter<br>F = Father's Day<br>G = Graduation<br>H = Holiday<br>I = Season's Greetings<br>J = Passover | Category | Yes |
| | K = Kwanzaa<br>L = Halloween<br>M = Mother's Day<br>N = New Year's Day<br>O = Bosses' Day<br>P = St. Patrick's Day<br>Q = Sweetest Day<br>R = Christmas<br>S = Baby Shower<br>T = Thanksgiving<br>U = Other<br>V = Valentine's Day<br>W = Wedding<br>X = Secretary's Day<br>Y = Chinese New Year<br>Z = Hanukkah | Category | Yes |
| ITEMGIFTMESSAGE | The message attached to an item intended as a gift | Char (160) | Yes |
| ITEMSHIPCOMMENTS | The additional free text instructions for shipment of an item | Char (160) | Yes |
| ITEMSHIPINSTRUCTION | The shipment instructions for an item<br>C = Ship when order complete<br>A = Ship as items become available<br>D = Ship on a specified date | Category | Yes |
| ITEMSHIPMENTNO | The shipment tracking number for an item | Char (19) | Yes |
| ITEMSHIPMETHOD | The method of shipping an item:<br>N = Next Day/Overnight<br>T = Two Day Service<br>W = Three day service<br>C = Lowest Cost<br>D = Carrier designated by customer<br>I = International<br>M = Military<br>P = Store pickup<br>O = Other | Category | Yes |
| ITEMWRAPPED | Indicates if the customer has requested gift-wrapping for an item<br>Y = Yes<br>N = No | Category | Yes |
| MANPARTNO | The manufacturer's part number for the ordered item | Char (30) | Yes |
| MANUFACTURER | The manufacturer of the ordered item | Char (50) | Yes |
| MERCHANTCOUNTRY | The country of the merchant, expressed using numeric ISO country codes | Category | No |
| MIERCHANTID | The acquiring bank's ID for the merchant | Char (20) | No |
| MERCHANTNM | The name of the merchant | Char (40) | No |
| MERCHANTSIC | The ISO Standard Industry Code (SIC) for the merchant. | Char (4) | No |
| MERCHANTZIPCD | The postal code of the merchant | Char (9) | No |
| NUMCARDS | Number of cards on account. | Numeric nnn(3 bytes) | No |
| OPENDT | Date account was opened from cardholder file. | Date ccyymmdd (8 bytes) | No |

TABLE 2-continued

Summary of Scoring Request Fields

| Field | Description | Format | Indexed? |
|---|---|---|---|
| ORDERBIN | The printed numbers under the BIN on the card number<br>Note: This data is provided only if a request has been made for the four digit number. Do not simply copy the first four digits of the card number to this field. | Char (8) | No |
| ORDERDT | The date of the order | Date | No |
| ORDERID | The order ID used to track orders. Also present in the Response structure | Char (32) | No |
| ORDERTM | The time of day for the order in HHMMSS where HH is 00-23, MM is 00-59 and SS is 00-59 | Time | No |
| ORDERTZ | The time zone for the order in offset from GMT (e.g., EST is −5); acceptable range is −12 to +12<br>Note: This is the same as the time zone of the merchant placing the order, and reflects the time zone associated with the order date. | Integer | No |
| PASSWORD | Indicates if the customer entered a password to access an account registered with the merchant<br>Y = Yes<br>N = No | Category | No |
| PAYMETHOD | The method used for making payment:<br>A = ACH<br>C = Check<br>G = Gift Certificate<br>M = Money Order<br>O = Card number provided online<br>P = Card present<br>V = Card number provided by phone<br>W = Wire Transfer<br>Note: The values of this field used for scoring are O, P and V. When another value is placed in this field, the order receives a score of 0. (It is not scored.) | Category | No |
| PINVERIFYCD | Authorization or posting: PIN verification:<br>I = Invalid<br>V = Valid | Category | No |
| PLASTICISSUEDT | Date of last plastic issue from cardholder file. | Date ccyymmdd (8 bytes) | No |
| PLASTICISSUETYPE | Plastic issue type:<br>I = Initial issue<br>R = Normal reissue<br>F = Force emboss (reissue owing to lost or stolen card) | Category | No |
| POSENTRYMODE | Authorization or posting: Keyed versus swiped:<br>K = Keyed (manual)<br>S = Swiped (magnetic)<br>Payment: Number of cycles delinquent | Category | No |
| POSTAUTHCD | Posting: Was the posting authorized?<br>Y = Yes<br>N = No<br>Payment: Payment reversal indicator:<br>D = Derogatory reversal<br>N = Non-derogatory reversal<br>Q = Payment<br>Nonmon: Audio Response Unit (ARU) inquiry:<br>A = Available credit inquiry<br>P = Payment info inquiry<br>S = Account status inquiry<br>T = Statement request<br>O = Other inquiry | Category | No |
| POSTDT | Posting: Date posting was processed<br>Payment: Payment due date | Date ccyymmdd (8 bytes) | No |

TABLE 2-continued

Summary of Scoring Request Fields

| Field | Description | Format | Indexed? |
|---|---|---|---|
| PRENOTE | An indication of whether this is a prenote transaction (only allowed when PAYMETHOD = A)<br>Y = Yes<br>N = No | Category | No |
| PREVIOUSCUST | Indicates if the customer has previously shopped online with this merchant<br>Y = Yes<br>N = No | Category | No |
| PRODCATEGORY | The category of the ordered product<br>S = Standard product offering<br>P = Promotional offering | Category | Yes |
| PRODCD | The product code of the ordered item | Char (18) | Yes |
| PRODDESC | The description of the ordered item | Char (160) | Yes |
| PRODQUANTITY | The number of units ordered | Numeric (12.2) | Yes |
| PRODSKU | The SKU number or product ID of the ordered item | Char (18) | Yes |
| PRODTYPE | The type of product ordered<br>P = Physical goods<br>D = Digital goods (e.g., software)<br>C = Digital content (e.g., images and/or text)<br>G = Gift certificate/digital cash<br>S = Shareware<br>M = Both digital and physical (e.g., software downloaded followed by media shipment)<br>R = Account replenish | Category | Yes |
| PRODUNITPRICE | The unit price of the ordered product | Numeric (12.2) | Yes |
| RECIPIENTADDRESS2 | A second address line for a recipient. | Char (30) | Yes |
| RECIPIENTAPT | The apartment/suite number where an item is to be shipped. | Char (6) | Yes |
| RECIPIENTCITY | The city used for shipping an item | Char (30) | Yes |
| RECIPIENTCOUNTRY | The country used for shipping an item, expressed using numeric ISO country codes | Category | Yes |
| RECIPIENTEMAIL | The email address of the recipient of an indexed item | Char (60) | Yes |
| RECIPIENTFIRSTNAME | The first name of the recipient of an indexed item.<br>Note: Only use data for the fields starting with RECIPIENT when products are to be shipped to more than one address. Otherwise, use CUST fields to specify recipient names and email address. | Char (30) | Yes |
| RECIPIENTLASTNAME | The last name of the recipient of an indexed item | Char (30) | Yes |
| RECIPIENTMIDNAME | The middle name or initial of the recipient of an indexed item | Char (30) | Yes |
| RECIPIENTPHONE | The recipient's phone number | Char (12) | Yes |
| RECIPIENTSALUTATION | The salutation for the recipient, e.g. MR, MRS, MS, DR, REV, etc, of an indexed item | Char (5) | Yes |
| RECIPIENTSTATE | The state used for shipping an item; expressed using state codes | Char (10) | Yes |
| RECIPIENTSTREET | The street address where an item is to be shipped.<br>Note: Only use data for the fields starting with RECIPIENT when products ordered are to be shipped to more than one address. Otherwise, use SHIP fields to specify recipient data. | Char (30) | Yes |
| RECIPIENTZIPCD | The postal code for shipping an item | Char (9) | Yes |
| REGLOYALTY | Indicates if the customer has registered for a loyalty program<br>Y = Yes<br>N = No | Category | No |
| REGPROMOS | Indicates if the customer has registered for promotions<br>Y = Yes<br>N = No | Category | No |

TABLE 2-continued

Summary of Scoring Request Fields

| Field | Description | Format | Indexed? |
| --- | --- | --- | --- |
| RESCORE | Indicates that the transaction has already been sent to the Service Bureaus. Default value is N. Legal values are N or Y. | Char (1) | No |
| RETURNALLOWED | Indicates if the merchant allows returns<br>Y = Yes<br>N = No | Category | No |
| SHIPADDRESS2 | A second shipping address line. | Char (30) | No |
| SHIPAPT | The apartment/suite number where an item is to be shipped | Char (6) | No |
| SHIPCITY | The city where an item is to be shipped | Char (30) | No |
| SHIPCOMMENTS | The additional free text instructions for shipment | Char (160) | No |
| SHIPCOUNTRY | The country where an item is to be shipped, expressed using numeric ISO country codes | Category | No |
| SHIPEMAIL | The email address of the recipient | Char (60) | No |
| SHIPFAX | Fax number of the person to whom goods are being shipped. | Char (12) | No |
| SHIPFIRSTNAME | The first name of the recipient | Char (30) | No |
| SHIPINSTRUCTION | The shipment instructions<br>C = Ship when order complete<br>A = Ship as items become available<br>D = Ship on a specified date | Category | No |
| SHIPLASTNAME | The last name of the recipient | Char (30) | No |
| SHIPMENTNO | The shipment tracking number | Char (19) | No |
| SHIPMETHOD | The method of shipment:<br>N = Next Day/Overnight<br>T = Two Day Service<br>W = Three day service<br>C = Lowest Cost<br>D = Carrier designated by customer<br>I = International<br>M = Military<br>P = Store pickup<br>O = Other | Category | No |
| SHIPMIDNAME | The middle name or initial of the recipient | Char (30) | No |
| SHIPPHONE | The phone number where an item is to be shipped. | Char (12) | No |
| SHIPSALUTATION | The salutation for the recipient, e.g. MR, MRS, MS. DR, REV, etc | Char (5) | No |
| SHIPSTATE | The state where an item is to be shipped, expressed using state codes | Char (10) | No |
| SHIPSTREET | The street address where an item is to be shipped | Char (30) | No |
| SHIPZIPCD | The postal code where an item is to be shipped. | Char (9) | No |
| SUBTOTAL | The subtotal price, bore calculation of taxes and shipping and handling | Numeric (12.2) | No |
| TAX | The charge for tax on the ordered product | Numeric (12.2) | No |
| TEST | Indicates that the transaction is for test purposes only. Default value is N. Legal values are N or Y. | Char (1) | No |
| TOTAL | The total price, including taxes, shipping and handling | Numeric (12.2) | No |
| TRANCATEGORY | The method used to place the order<br>I = Internet<br>P = Card Present<br>T = MOTO | Category | No |
| TRANTYPE | The type of transaction<br>A = Address Verification Service (AVS)<br>C = Credit<br>P = Purchase<br>R = Reversal<br>Note: When this field is set to A, C or R, the transaction is not scored, but is sent to the scoring system 114 to add to the database. When using these field values, make sure the Request argument of Send is set to | Category | No |

TABLE 2-continued

Summary of Scoring Request Fields

| Field | Description | Format | Indexed? |
|---|---|---|---|
| | NOREQUEST. If the argument is set to REQUEST, a zero score is returned, indicating an error. | | |
| UPC | The Universal Product Code of the ordered item | Char (12) | Yes |
| USERDATA01 | User-defined order field | Char (256) | No |
| USERDATA02 | User-defined order field | Char (256) | No |
| USERDATA03 | User-defined order field | Char (256) | No |
| USERDATA04 | User-defined order field | Char (256) | No |
| USERDATA05 | User-defined order field | Char (256) | No |
| USERDATA06 | User-defined order field | Char (256) | No |
| USERDATA07 | User-defined order field | Char (256) | No |
| USERDATA08 | User-defined order field | Char (256) | No |
| USERDATA09 | User-defined order field | Char (256) | No |
| USERDATA10 | User-defined order field | Char (256) | No |
| WEBSITE | Website from which the purchase has been made. | Char (60) | No |
| WRAPPED | Indicates if the customer has requested gift-wrapping<br>Y = Yes<br>N = No | Category | No |

In one embodiment, the following fields are used for every order processed by the scoring system 114:
MERCHANTNM
ORDERID
ORDERDT
ORDERTM
ORDERTZ
PAYMETHOD
TOTAL The following fields are used if PAYMETHOD is O (card number provided online), P (card present) or V (card number provided by phone):
CARDNO
CARDEXPDT
AUTHAMT
AUTHDT
AUTHTM
CARDTYPE
TRANTYPE The following fields are used if PAYMETHOD is A (ACH):
ABA
ACCTTYPE The following fields are used only when multiple products are ordered and shipped to recipients at multiple physical addresses:
PRODSKU
PRODCD
UPC
MANUFACTURER
MANPARTNO
PRODDESC
PRODTYPE
PRODQUANTITY
PRODUNITPRICE
PRODCATEGORY
RECIPIENTFIRSTNAME
RECIPIENTLASTNAME
RECIPIENTEMAIL
ITEMGIFTMESSAGE
ITEMGIFTCARDTYPE
ITEMCARDATTACH
RECIPIENTMIDNAME
RECIPIENTSALUTATION
RECIPIENTSTREET
RECIPIENTAPT
RECIPIENTADDRESS2
RECIPIENTCITY
RECIPIENTSTATE
RECIPIENTCOUNTRY
RECIPIENTZIPCD
ITEMSHIPMETHOD
ITEMCARRIER
ITEMSHIPMENTNO
ITEMSHIPINSTRUCTION
ITEMSHIPCOMMENTS
ITEMWRAPPED
RECIPIENTPHONE The scoring response by the scoring system 114 preferably contains a score generated by the statistical model, along with zero or more reason codes that explain the basis for the score. The reason codes are particular to the variables used by the statistical model, but typically will indicate one or fields of the data that represent unusual activity or data in the transaction, unexpected changes in data, mismatches, or invalid data. For example, unusual activity may include as an unusual merchant, dollar amount, shipping method, zip code, billing address, email address, telephone number and so forth. An unexpected change may be a change in the address, telephone number, IP address, email address, payment method. Mismatches include mismatches between billing address and telephone number, email address and IP host, email and billing address, IP host and billing address, and so forth. Invalid data includes invalid card number, dates, and so forth.

Example reason codes are as follows:

TABLE 3

Reason Codes

| Code | Description |
| --- | --- |
| 0 | No code |
| 1 | Unusual time of day/week/year behavior |
| 2 | Unusual merchant activity |
| 3 | High-risk merchant activity |
| 4 | Suspicious high dollar activity |
| 5 | Suspicious dollar amounts |
| 6 | Suspicious geographic activity |
| 7 | Risky AVS result |
| 8 | Suspicious authorization velocity ($) |
| 9 | Suspicious shipping method |
| 10 | Suspicious shipping zip |
| 11 | Inconsistent shipping or billing address |
| 12 | Suspicious account information |
| 13 | Suspicious email address |
| 14 | Suspicious payment method |
| 15 | Ship-to/bill-to address mismatch |
| 16 | High-risk merchant + amount activity |
| 17 | Change from historical payment method/card number |
| 18 | Address change |
| 19 | Email address change |
| 20 | IP address change |
| 21 | Suspicious telephone number |
| 22 | Bad phone number |
| 23 | Bill-to-address/phone mismatch |
| 24 | Email-address/host mismatch |
| 25 | Email/billing address mismatch |
| 26 | Email/IP-host mismatch |
| 27 | Bill-to-address/IP-host mismatch |
| 28 | Billing email/shipping (recipient) email address |
| 29 | Suspicious name field |
| 30 | Issuer declined |
| 31 | Issuer referral |
| 32 | Issuer pickup |
| 33 | Suspicious goods |
| 34 | Invalid card number |
| 35 | Card number generator |
| 36 | Suspicious authorization velocity (#) |
| 37 | Suspicious gift message |
| 100 | Duplicate transaction |

The reason codes are returned to the rule engine 112, which has a corresponding lookup table for interpreting the codes. The foregoing set of reason codes is merely exemplary, and other reasons and codes may be used.

In one embodiment where a proxy server 200 is used, the proxy server 200 is the calling application mentioned above, and interfaces with the scoring system 114 itself. In this embodiment the proxy server exports an interface to the merchant system 103 to allow the merchant system to forward scoring requests to it.

Where the proxy server 200 is used, it provides the above described API for scoring system 114, along with additional function calls to specific to it. These include:

TABLE 4

Summary of Additional Proxy Server Function Calls

| Function Call | Description |
| --- | --- |
| ProxyCreate | Creates a handle to a new Proxy Server, and initializes state for the new server. |
| ProxyListen | Sets up the proxy socket and starts listening for incoming connections. |
| ProxyShutdown | Disconnects and shutdown the Proxy Server. |
| ProxyFree | Releases the memory used by the Proxy Server. |
| ProxyGetStatistics | Extracts statistics from the Proxy Server. |

TABLE 4-continued

Summary of Additional Proxy Server Function Calls

| Function Call | Description |
| --- | --- |
| ProxySetError | Logs an error message to the Proxy Server log file. |
| ProxyGetWorkers | Returns the number of Proxy Server worker threads to instantiate for handling the client send/receive message pipeline. |
| ProxySetWorkers | Specifies the number of Proxy Server worker threads to instantiate for handling the client send/receive message pipeline. |

Policy Management Workstation

The Policy Management Workstation 110 provides an easy and safe way to add predictive power to the rule engine 112. The PMW 110 allows fraud managers to easily define and deploy rules to automate various fraud prevention procedures in response to information provided by the scoring system 114. It provides a simple means of writing and implementing rules that can be used to create or reopen fraud cases based on the order fields or the score. PMW 110 lets the merchant apply different score thresholds to different sets of credit cards or to users whose IP addresses fall within certain ranges.

More specifically, the PMW 110 allows the merchant to:
Define or refine the circumstances that determine the disposition of online orders. Such rules may incorporate neural network scores, data from a customer database, or data transmitted in scoring request and response messages exchanged by the rule engine 112 and an external system.
Define or refine order dispositions for records matching predefined criteria, such as accept, reject, outsort or display a new web page.

Overview of the Rule Engine and Rule Bases

Figure 4:
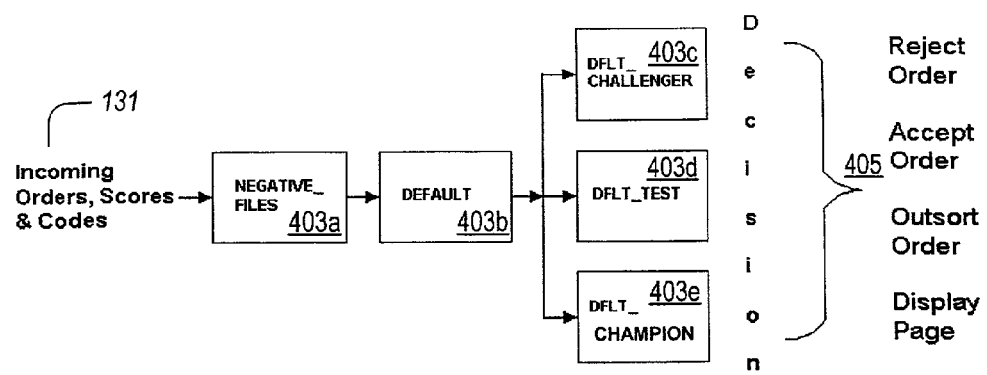
FIG. 4 illustrates the basic processing flow of the rule engine.

In order to better understand the operation of the PMW 110, there is first described the operation of the rule engine 112 in using rules to process scored transactions. Referring now to FIG. 4, there is shown the basic processing flow provided by the rule engine 112 for a typical order. The flow illustrates an incoming order 131 after it has been assigned a score, reason code and exception code from the scoring system 114, and returned with this data the rule engine 112. As the order 131 proceeds through the rule engine 112, it is processed through rule bases 403 containing rules that recommend the final outcome, resulting in one of the sample actions 405 shown on the right of the diagram.

In the illustrated embodiment, there are five different rule bases 403 used by the rule engine 112.

NEGATIVE FILES 403a: This rule base is used by the rule engine 112 to check incoming customer data against stored negative information, such as phone numbers, IP addresses, card numbers and so on. A Negative file lists data that is identified to be linked with fraudulent or suspicious activity or sources of transactions. Negative results from these rules can immediately reject incoming orders. A sample rule might reject orders from customers with certain IP addresses. When an order is rejected, the customer does not actually receive the information. A flag is set and the data is returned back to the merchant so they can take action. In one embodiment, a generic set of negative rules is provided, and merchants can use the PMW to modify such rules.

DFLT_CHAMPION 403d: This rule base contains the rules to be processed against incoming scored orders.

DEFAULT 403b: This rule base contains a sample rule that specifies when to apply the rules of the DFLT_CHAL- LENGER 403c, DFLT_TEST 403d and DFLT_CHAMPION 403e rule bases. In one embodiment, it provides a rule syntax that applies the rules of the DFLT_CHALLENGER and DFLT_TEST rule bases if the customer placing the order is generated a random number greater than or equal to 95, and to apply the rules of the DFLT_CHAMPION rule base otherwise.

DFLT_CHALLENGER 403c: This rule base is a test bed for rules that may eventually be introduced to the DFLT_CHAMPION rule base 403e. For example, the default challenger may contain all rules of another rule base, with one of the rules deleted, or a new rule added, or one modified rule. These rules must be created with different rule names, however. A small percentage of orders will go through this rule base to determine if it is more effective than the rule base currently in use. If the default challenger is proven to be more effective than the champion, it can be promoted to replace the champion.

DFLT_TEST 403d: This rule based contains additional rules that may eventually be added to the DFLT_CHALLENGER rule base. Contains rules to be tested before going into production. The rules are fired and logged, but do not have any affect on the outcomes of orders.

The challenger, champion, and test rule bases may also contain sequential rules that define the sequence in which other rules in the rule base are to be executed.

Once processed by the rule engine 112, the result is that the order is either rejected, accepted, outsorted, or more information is requested from the consumer by displaying a web page form.

Rules do not affect the score provided by the scoring system 114. Rather, they fine-tune the prediction of the eventual outcome of the transaction so that users or the fulfillment system 102 itself can take different actions depending on the circumstances. For example, a rule might take an action based on a consumer's IP address or email address, such as hotmail.com, and outsort the order specifically for further review.

Rules typically are "if-then" constructs that are based on human judgment and experience and can be used to add knowledge to models and specify actions to take based on various circumstances. Various factors are to be considered when designing the rules. The type of goods being purchased is one consideration, for example, digital versus physical. The category of merchandise is another consideration, such as books versus gambling. The price of goods is another consideration, especially when determining whether to outsort an order. For example, if an order has a relatively high score, but is also for a very high amount, the merchant may want to try to rescue the order from rejection by further human investigation. The Policy Management Workstation also provides the capability of generating risk-based form filling, where there is provided a basic form that the consumer fills out, and the scoring system 114 evaluates and returns a score. Based on that score, the rules can spawn new pages that request more information, request that the consumer call the merchant or inform the consumer to expect a phone call from the merchant. However, a concern here is that the more information the merchant asks of the consumer, the less likely he or she is to buy.

Rules can also be used to add knowledge to the scoring models, and enhance the decision making process. The scoring models are based on historical information. Sometimes a recent event, however, can change the statistical likelihood predicted by a model. For example, a theft of credit cards from a post office could raise the likelihood of fraud in the zip codes covered by that post office, at least for a time. However, this event would not be reflected in an scoring model because the model was not built using data reflective of this type of occurrence. Consequently, it would be useful to deploy a rule to open fraud cases on all transactions in the affected zip codes, regardless of their fraud scores. In effect, the rule would add knowledge of the theft to the existing model.

In addition to using rules to respond to short-term fraud threats, the merchant can use them to represent patterns not reflected in the scoring model. Rules can also be deployed to reflect fraud trends that have not yet become solid in the historical data used when building the scoring model, and to take into account data sources not used by the model.

Rules are generally written by identifying fraud detection problems that the merchant wishes to solve, and articulating narrative expressions of the rules for detecting such fraud. The narrative expressions are then converted to pseudo code "if-then" statements, and organized in a logical manner. From there, the rules are encoded in the syntax of the rule base, using the appropriate functions, operators, and constants. For example, a rule may be:

if order.customer_email:=hotmail.com then RejectOrder (13)

This rule states that if a customer's email address is hotmail.com, the order is rejected per reason code 13—a suspicious email address.

Another sample rule displays a web page to obtain additional information from the customer:

if order.Score>=HighestScore then DisplayPage(pageid) and outsortorder(order.orderid);

This rule requests additional information or requesting that the customer contact the merchant, and sends orders with scores greater than "HighestScore" to the Order Management Workstation via the OutsortOrder function. Here HighestScore is a global constant set up by the merchant. For example, HighestScore might be equal to 950.

Rule Structure

More generally, rules consist of statements that define conditions and determine actions to be taken if the conditions prove to be true—for instance: If a customer's IP address falls within a certain group of numbers, then reject the order. Rule statements are written in a simplified version of the Pascal programming language. The following syntactic constructs are supported:

IF . . . THEN . . . END statements
Begin . . . end blocks
Value assignment to data elements
Structured references to data elements
Function calls
Complex mathematical statements using addition, subtraction, multiplication and division, Boolean operators, supporting nesting of sub-statements within brackets.

In one embodiment, the PMW 110 provides an easy to use graphical user interface that includes various windows and menus for creating rules, selecting operators, variables constants, functions, and other rule elements, and for sequencing the rules within a rule base.

The IF . . . THEN . . . ELSE construction of rules is generally conventional, allowing for nesting of conditions and actions. Begin and end block are set off by the BEGIN and END keywords, and delimit distinct elements of a rule to be treated as unit. Blocks group actions, nested conditions, or the creation of variables. BEGIN and END keywords must correspond.

Variable value assignment is provided by a VAR keyword, followed by a variable name and type.

There are several requirements when defining a variable: Variables are created at the beginning of the rule, in a section that begins with the VAR keyword.

The line creating each variable consists of a name, a colon, a type, and a semicolon. The variable name may be any string of alphanumeric characters, including the "_" character. The only two valid types are STRING and NUMERIC.

The end of the variable-creation block is indicated by the keyword BEGIN, signaling the beginning of the next section.

After the BEGIN, each variable is set to a value through the use of the set-field operator, :=, and each variable-setting statement terminates in a semicolon. Each may then be used in conditions or actions defined in IF, THEN, or ELSE statements.

The structured reference to data elements is provided by template fields. Template fields have two parts to their names, separated by a period (.). The segment to the left of the period indicates the data feed or template from which the field comes. The segment to the right of the period is the name of the field. A template is either an order or response template. The order template contains all fields containing data pertaining to online orders. The response template contains all fields containing responses from the scoring system 114. By specifying the appropriate template field, a rule can respond to the value of any element of the order or the response. For example "ORDER.billstate" provides the billing state of the customer.

The operators include the standard +, −, *, /, =, <>, <, >, <=, >=, AND, NOT, OR, and IN. Functions include standard date, time, and string manipulation and conversion functions (e.g. converting time or dates to seconds or day numbers, days of week; left, right, mid string truncation) and numeric functions (maximum, minimum, absolute value, modula, random value, round).

In addition, functions specifically for accepting, rejecting, and outsorting orders are provided, along with a function for displaying a page. The syntax of these functions is as follows:

AcceptOrder
Syntax: AcceptOrder(<<ReasonCode>>)
Arguments: <<ReasonCode>> a four character alphanumeric code that provides the reason for acceptance of an order.
Return Type: N/A
Description: Sets the decision code in the response message to AcceptOrder. If database logging is turned on, it logs the rule id, order id, reason code and decision in the rule log table. If the rule base is not a test rule base, the order information is written to the order, order detail and customer tables in the workstation database.

DisplayPage
Syntax: DisplayPage(<<PageID>>)
Arguments: <<PageID>> the URL of the page to be displayed.
Return Type: N/A
Description: Displays the page represented by the URL specified in <<PageID>>.

OutsortOrder
Syntax: OutsortOrder(<<ReasonCode>>)
Arguments: <<ReasonCode>> a four character alphanumeric code that provides the reason for outsorting an order.
Return Type: N/A
Description: Sets the decision code in the response message to OutsortOrder. If database logging is turned on, it logs the rule id, order id, reason code and decision in the rule log table. If the rule base is not a test rule base, the merchant id, order_id and reason code are written to the Outsort log file.

RejectOrder
Syntax: RejectOrder(<<ReasonCode>>)
Arguments: <<ReasonCode>> a four character alphanumeric code that provides the reason for rejection of an order.
Return Type: N/A
Description: Sets the decision code in the response message to RejectOrder. If database logging is turned on, it logs the rule id, order id, reason code and decision in the rule log table. If the rule base is not a test rule base, the order information is written to the order, order detail and customer tables in the workstation database.

Finally, a rule is provided to test a field value against a negative file 403a:

NegativeFile
Syntax: NegativeFile(<<FileName>>, <<DataElement>>)
Arguments: <<FileName>> the name of the negative file. <<DataElement>> a string matched against an entry in the specified negative file database table. For example, a telephone number, card number, IP address, IP domain, etc.
Return Type: Integer
Description: Returns 1 if the key value matches a record in the negative file. Returns 0 if there is no match in the file, if the Delete Flag is set or if the ExpirationDate has elapsed. The Delete Flag indicates that negative data element (e.g. a cardnumber) is to be deleted and used. The ExpirationDate indicates the date that the element ceases to be valid member of the negative file.

An example negative file function is the following:
IF    NegativeFile("phones",ORDER.billphonenumber)
THEN RejectOrder(5);

In this example, the phones negative file is queried to see if the phone number on the order matches one of the numbers in the phones negative file. If so, the order is flagged for rejection.

Decision Codes

The response structure used by the rule engine 112 uses the decision codes to indicate the status of each order following rule processing. These codes are used by the OMW to select the appropriate queues or by the fulfillment system to complete processing of the order.

TABLE 5

Decision Codes

| Code | Description |
| --- | --- |
| 0 | Sends flag to accept order |
| 1 | Sends flag to reject order |
| 2 | Sends flag to send order as an outsort to the Order Management Workstation. |
| 3 | Processes the specified page ID to display a browser page, according to customer-developed programming linked to e-commerce application. |

Using Negative Files
a) Card Number Negative Files

Most conventional fraud detection systems rely heavily on negative files for their online payment card fraud-risk decisions. While the scoring system 114 allows the merchant to build and use negative files, the system's scoring model already takes into consideration negative customer behavior on each payment card account, in a way that is vastly superior to the simple use of negative files. Credit-card based negative files, on the other hand, are human constructs that only describe the past negative behavior on those accounts. The use of this type of negative file alone in fraud decisions is by definition extremely limiting and ineffective. This is because by the time the information is placed into negative files by humans, the cards have usually been cancelled, and subsequent authorizations declined. If the merchant accepts a card which has been cancelled, the merchant is assessed a chargeback.

Merchants get a good volume of chargebacks from cardholders who take advantage of the card-not-present (CNP) charge-back rules and lie to disclaim participation in a purchase in which they participated. Card issuers often will not reissue cards on accounts with two or more CNP charge backs. Some issuers allow more. Issuers view the need to reissue cards as an added expense and inconvenience to their customers.

This means that online merchants can get transaction requests from cardholders who have successfully disputed legitimate transactions, and thereby stolen from them. Charge requests can be authorized by the issuer because they did not block the card. Orders can then pass through the merchant's fraud-detection system if the merchant has not put the card number in its negative files.

The merchant therefore should create a negative file for card numbers of customers who have stolen from them before. The limitation to this is that the customer can use another credit card the next time they make a fraudulent purchase. The multi-key profiling capability described above, provides a solution to identify such customers.

b) Using Addresses & Phone Numbers

Another kind of negative file that may be used by a merchant is a file of addresses of customers who have made fraudulent purchases, so that the merchant no longer sells and ships goods or services to those same addresses. The merchant can also create files to block orders from phone numbers where fraudulent purchases were made. The limitations, however, are that these are static negative files and people have a tendency to move, especially people in the habit of defrauding others. Someone else may move to the same address who is a legitimate customer. The phone company also reuses phone numbers. Thus both the address and phone number negative files may block good customers from making purchases. It is desirable therefore to institute policies and procedures for updating these files on a regular basis.

c) Using eMail Addresses

A merchant can also create a negative file of all email addresses from which fraudulent orders have been made. The limitation here is that it is easy to use a bogus card to sign up for a new email address online, with AOL, Hotmail or Yahoo. Fraudsters can then give a new email address the next time they make a purchase. Again, these files need to be frequently updated.

d) Using IP Addresses

A substantial amount of charge-back losses may be experienced on orders submitted from a specific IP address or range of IP addresses. These IP addresses can then put into a negative file. It is, however, easy to spoof an IP address, and is common that fraudsters use different IP addresses the next time they attempt an order. Again, frequent updating is desirable.

e) Using Zip Codes, Country Codes

Significant chargebacks may be experienced from certain zip codes. Likewise, some countries have high fraud percentages, such as Russia, Romania, Brazil and Argentina. The merchant can set up negative files of zip codes and countries to which it does not wish to ship merchandise.

f) Fake or Rude Names

It is also desirable to establish negative files for customer names, including the names of customers who made fraudulent purchases, in addition to names such as John Doe, Mickey Mouse or Donald Duck. Another more obtuse but interesting names negative file includes keyboard strings like "ASDF", "QWER, :LKJ", "1234", and so on, that are quick to type. Some fraudsters use rude strings to rub in the fact that they are stealing from the merchant. These names should also be put into negative files. The limitation is that as fraudsters become more sophisticated, they will not use keyboard strings and raunchy names.

Rules created via PMW 110 may be used to overcome some of the limitations of negative files described earlier, such as address and phone number changes. For example, a rule may say if the fraud score is high and the phone number is in a negative file, decline the order, but if the score is low approve or outsort the order. Rules can also cover multiple negative file hits. For example, if the rule looks at three negative files, Rude Names, Keyboard Strings, and Email Addresses, and all three are found, then a higher risk is assigned than if only two are found.

Using Velocity Rules

A velocity rule is a rule created via PMW, that lets the merchant track the number of times orders have been processed for certain key data, and lets the rule engine 112 automatically execute decisions based on those velocities. The rule engine 112 lets the merchant easily track velocities on multiple ORDER template fields over multiple time frames. Key data can be specific instances of any field of the ORDER template, such as credit card numbers (CARDNO), Social Security numbers (CUSTSSN), or customer IP addresses (CUSTIP).

The following table shows all fields of the ORDER template whose velocities the merchant can track using rules.

TABLE 6

Fields Available for Velocity Tracking

| | | |
|---|---|---|
| ABA | CUSTFAX | PRODQUANTITY |
| ACCTTYPE | CUSTFIRSTNAME | PRODSKU |
| ACHRESPONSE | CUSTHOMEPHONE | PRODTYPE |
| AUTHAMT | CUSTID | PRODUNITPRICE |
| AUTHDT | CUSTIP | REGLOYALTY |
| AUTHRESP | CUSTLASTNAME | REGPROMOS |
| AUTHTM | CUSTMAXAGE | RESCORE |
| AVSRESPONSE | CUSTMIDNAME | RETURNALLOWED |

TABLE 6-continued

Fields Available for Velocity Tracking

| | | |
|---|---|---|
| BILLAPT | CUSTMINAGE | SHIPAPT |
| BILLCITY | CUSTSALUTATION | SHIPCITY |
| BILLCOUNTRY | CUSTSSN | SHIPCOMMENTS |
| BILLSTATE | CUSTWORKPHONE | SHIPCOUNTRY |
| BILLSTREET | CVV2DATA | SHIPFAX |
| BILLZIPCD | DEFFORMFLLL | SHIPFIRSTNAME |
| CARDEXPDT | FORGOTPWD | SHIPINSTRUCTION |
| CARDNO | GIFTCARDTYPE | SHIPLASTNAME |
| CARDTYPE | GIFTMSG | SHIPMENTNO |
| CARRIER | HANDLING | SHIPMETHOD |
| CORPCITY | MANPARTNO | SHIPMIDNAME |
| CORPCOUNTRY | MANUFACTURER | SHIPSALUTATION |
| CORPFAX | MERCHANTCOUNTRY | SHIPSTATE |
| CORPNAME | MERCHANTID | SHIPSTREET |
| CORPPHONE | MERCHANTNM | SHIPZIPCD |
| CORPPONBR | MERCHANTSIC | SUBTOTAL |
| CORPPURCHASE | MERCHANTZIPCD | TAX |
| CORPPURCHDESC | ORDERBIN | TEST |
| CORPSTATE | ORDERDT | TOTAL |
| CORPSTREET | ORDERTM | TRANCATEGORY |
| CORPSUITE | ORDERTZ | TRANTYPE |
| CORPZJPCD | PASSWORD | UPC |
| CURRCD | PAYMETHOD | WEBSITE |
| CUSTAGE | PRENOTE | WRAPPED |
| CUSTBDATE | PREVIOUSCUST | PRODCD |
| CUSTCOOKIES | CUSTEMAIL | PRODCATEGORY |

Each of these fields may be associated with a unique code or tag, which can then be used to identify the field instead of by its field name.

Types of Velocity Rules

There are two types of velocity rules the merchant can create. The rule types work together to track velocities and make decisions based on tracked velocities:

UpdateVelocity: Tracks the velocity for one or more fields from the ORDER template. For each field tracked, such as CARDNO, this rule records the date and time an order is processed for a specific instance of the field, such as a specific credit card number. The records are maintained in flat files. The number of records maintained in each flat file, the period of time over which they can occur, and the maximum number of events stored during that time frame are specified in a configuration file.

Velocity: Makes decisions based on a specific velocity. For example, if a customer uses his or her credit card number three times in one week, the merchant can use a Velocity rule to outsort or reject the next order. Similarly, if an order is placed from the same IP address, or using the same Social Security number, too many times within a specified time period, the merchant can use a Velocity rule to outsort or reject the next order. (If the merchant chooses to outsort the order, it will require human intervention for research to determine if the order is valid or fraudulent.)

Velocity rule bases are created like other rule bases, and sequenced for execution as well. It is preferable that velocity rules are executed before negative files in order to track the data fields in orders rejected by the negative files.

To create both types of velocity rules, the merchant uses a tag integer value that maps velocity fields to integers used internally by the rule engine 112. To make it easier to see which velocities are being tracked, the merchant should set up each field to be tracked as a constant that represents its tag integer value. For example the CARDNO field may be represented by a constant tag "12". To track velocities then, the merchant adds a rule that creates and updates records for the key value of each field whose velocity the merchant wish to track. For example, the merchant can create a rule that will create and update a record that tracks velocity for each credit card number, Social Security number or IP address. This done using an UpdateVelocity rule function, which updates the flat file that tracks the desired field.

The UpdateVelocity function takes the following arguments:

UpdateVelocity(<<tag>>,<<key>>,<<date>>,<<time>>)

Tag The constant defined for the first field whose velocity the merchant wish to track. For example, replace <<tag>> with CARDNO, if the merchant has added the field name as a constant. The merchant can also use the number 12 for this field, which is the tag number to which the field is mapped internally.

Key The variable used to track the velocity for specific values of the field. For example, replace <<key>> with ORDER.cardno.

Date The date of the order. (Replace <<date>> with ORDER.authdate.)

Time The time of the order. (Replace <<time>> with ORDER.authtime.)

For example, the function appears as follows when the merchant wish to update the velocity on all credit card numbers:

UpdateVelocity(CARDNO, ORDER.cardno, ORDER.authdate, ORDER.authtime)

The merchant repeats this process for each field whose velocity the merchant is tracking. Additional examples of velocity tracking.

UpdateVelocity(CARDNO, ORDER.cardno, ORDER.authdate, ORDER.authtime)

UpdateVelocity(CUSTSSN, ORDER.custssn, ORDER.authdate, ORDER.authtime)

UpdateVelocity(CUSTIP, ORDER.custip, ORDER.authdate, ORDER.authtime)

Once the UpdateVelocity rule is define, the merchant next defines a velocity decision rule, using the tracked velocity field. For example:

IF Velocity(CARDNO,ORDER.cardno,"6D")>=3 THEN Rejectorder("8")

This rule states that if three or more orders have been placed in the past six days for the current credit card number, the order is flagged as a reject and assigned reason code 8, representing a suspicious velocity.

More generally, the Velocity rule has the following syntax:

Velocity(tag, key, period)

The tag and key arguments are the same as those described above. The period argument represents the time over which the merchant wishes to calculate the velocity for the specified field, represented by nS, nM, nH, nD or nW, where n is an integer and S, M, H, D or W specify seconds, minutes, hours, days or weeks.

Once one or more velocity rules are defined, the rule engine 112 is restarted in order to register the new rules.

The rule engine 112 API includes functions to effect the use of velocity rules by the fulfillment system.

TABLE 7

Rule Engine API Velocity Functions

| Function | Description |
| --- | --- |
| VelocitySystemInit | Initializes the velocity database files. |
| OpenVelocityFile | Opens a velocity file for the specified field, or if necessary, creates and opens a new velocity file for the field. |
| CloseVelocityFile | Closes the velocity database for the tagged variable. |
| VelocitySystemTerm | Terminates the velocity database file system |

The following sample code opens a velocity flat file that tracks up to three orders made on each credit card number for up to 6 days (6×24=144 hours), and holds up to 10,000 records

```
static void VelocitySystemInit(void *Handle)
{
    OpenVelocityFile(Handle, CARDNO, 10000,3, 144);
}
static void VelocitySystemTerm(void *Handle)
{
    CloseVelocityFile(Handle, CARDNO);
}
```

Placing Rules into Production

Once a set of rules is defined, it is placed into the production environment through a testing protocol. New rules are created, placed into a minimal production environment, further tested and refined, and then finally promoted to full production. It is most desirable that rules be tested appropriately in a non-production environment before being moved into a champion/challenger production environment. Untested rules can have unintended and potentially disastrous effects.

The Policy Management Workstation lets the merchant run preliminary tests on rules before moving them into production. This is typically done for several days, with the rules in the DFLT_TEST rule base 403d. As noted above, these rules operate on the order, but have no impact on the order handling. The merchant can then evaluate these rules individually before deciding to move them into their corresponding challenger rule base, which places them into production for a small percentage of the orders processed by the scoring system 114 (e.g. a 5% sample). This is done to make sure that the merchant does not introduce unexpected consequences into the production environment.

In order to judge the efficacy of the test rules, it is desirable to measure the frequency and accuracy of the rule firings. Frequency is determined by the number of rule firings. Accuracy is determined by examining fraud detection and false positive rates for each rule. Once a desired level of frequency and accuracy are reached, a rule may be moved to the challenger rule base for further testing.

Once moved into the challenger rule base, a rule will accept, reject, outsort, or request additional customer information via web page on a small percentage of orders it processes through the scoring system 114, eliminating the need to test the entire data feed being handled. Again, it is important to measure the effectiveness of the system after placing one or more rules into a challenger rule base 403c.

A valuable report for learning the efficacy of a challenger rule base is the frequency of firing of a rule when data is flowing through it. This report tells the merchant how often a rule is actively operating to manage an order.

If after moving a rule to a challenger rule base, it is determined that the rule is not performing as desired, it may be moved back to its test rule base 403d for further modification.

To obtain adequate confidence in a challenger rule base, it is desirable to operate such rules for a more extended period of time, from several weeks to several months. Once satisfied, the merchant can the promote challenger rules into the champion rule base 403e.

Using eFalcon Scores

A primary output of the eFalcon system 100 is the fraud score that measures the likelihood that each order is fraudulent. In one embodiment, the merchant may create a rule that sets a threshold, or "cutoff score," above which all orders are rejected. The merchant might then create a different rule, with a lower threshold score, "outsort score," for which all orders receiving scores above that threshold and less than the first are flagged for further investigation. For example, these rules may be defined as follows:

IF order.Score>=CutoffScore THEN RejectOrder(<<reasoncode>>);

IF order.Score<CutoffScore and order.Score>=OutoutScore THEN outsortorder(order.orderid);

In another embodiment, such orders can be automatically sent to the Order Management Workstation, to be tracked and handled via human intervention. These powerful tools put decision-making ability into the merchant's hands. By defining rules, the merchant can modify the basic system to meet the specific product, customer, and business requirements of the merchant's organization.

In using the eFalcon system, the determination of the cutoff score above which orders are investigated results from a cost-benefit analysis based on the fraud risk score and possibly other factors. The cost is the human resources required to investigate false-positive orders, and the benefit is the detection of genuine frauds and the prevention of fraud losses. An order should be investigated only when the expected benefit exceeds the expected cost. A further discussion of this cost-benefit analysis is set forth below.

An optimal strategy to improving the cost-benefit analysis is to investigate the riskiest accounts first. This strategy maximizes the number of frauds caught per customer contacted. Investigation should proceed down the list, through successively less risky accounts, and continue until the incremental cost of detecting the next fraud outweighs the expected fraud savings.

Figure 5:
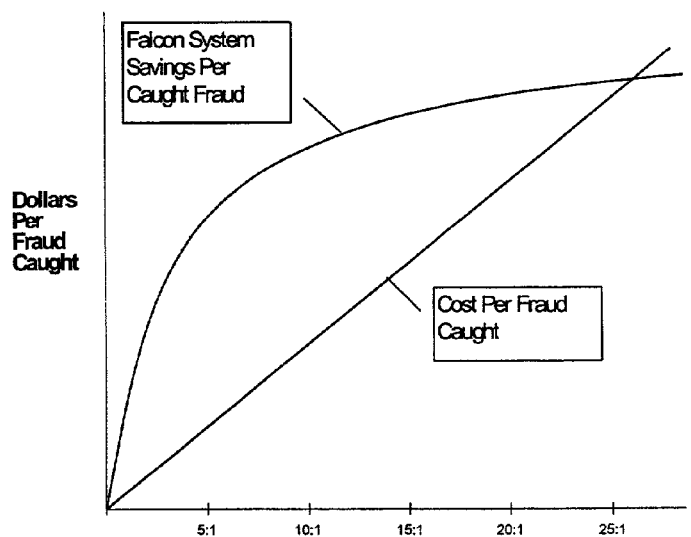
FIG. 5 is a graph illustrating how to determine the optimal thresholds for the fraud scores.

FIG. 5 shows how the optimal threshold for fraud investigation is determined from the investigation process cost per fraud and the expected fraud savings at each risk level. These curves are for illustration purposes only—each merchant will have a unique set of characteristic curves similar to these. The x-axis of FIG. 5 shows the false positive rate. The y-axis shows the dollars saved per number of fraudulent orders caught. The curve labeled "Savings per Fraud Caught" indicates the dollar amount that the eFalcon system would save at different false positive rates. The straight line labeled "Cost per Fraud Caught" shows how the cost per fraud caught rises with higher false positive rates. The cost per fraud caught is directly proportional to the false positive rate up to a factor determined by the merchant's fraud investigation process.

FIG. 5 indicates that from a savings point of view, it is desirable to have a relatively low cutoff score, because the result is a low monetary loss per fraud account. However, a low cutoff score also results in a higher false positive rate, which in turn yields a higher cost for the process of calling cardholders. The area between the system savings curve and the cost line represents the net dollar savings from the use of the risk score. The optimal cutoff score is the score at which the net savings are maximized. Note how the optimal threshold varies depending upon the investigation cost represented by the straight line and the expected fraud savings represented by the curved line. The merchant must decide on the merchant's own cutoff scores based on the merchant's estimates of the costs of phone calls, the merchant's prior credit card fraud losses and internal policies.

Working on orders assigned high scores is one way the merchant can use the system 100 to manage fraud risk. Alternative strategies can be developed to optimize different business objectives or incorporate previously unavailable information. The rules the merchant creates via the PMW 110 let the merchant incorporate expert opinion concerning high-risk activity, such as zip codes associated with known fraud rings, when designing the merchant's fraud prevention policies. For example, suppose the merchant's fraud expert determines that a fraud ring is operating somewhere in Chicago. The merchant can create rules that outsort all orders originating from zip codes in the areas that pose the highest risk.

With the system 100, the merchant's fraud analysts can add their knowledge of these conditions to the system as rules that create the most effective responses to high-risk situations. In this way, the system 100 provides an expert system capability combined with the system's statistical scoring models 316. The result is more flexible and powerful fraud detection that is adaptive to abnormalities.

Selecting Score Thresholds

Assessing Internet fraud risk is not a one-dimensional exercise. There are several categories or classes of risk. There are two types of risk classes that are often used synonymously, product risk and transaction risk, that should be separated and distinguished from each other. Product risk is the risk associated with the type of goods or services that the Internet merchant sells. Some products and services, by their very nature, are inherently more risky than others. For example, items that are easily convertible to cash, popular and desirable to be stolen, or are frequently disputed by cardholders have a high product risk. Assessing product risk is best accomplished by evaluating the Internet merchants market segment, historical risk performance, and business policies and practices.

Transaction risk is the risk inherent in each individual Internet transaction or order. Although a merchant may choose to do business in a high-risk product segment, the majority of their Internet orders are going to be legitimate. For example, what is the risk of fulfilling an order for one CD burner as compared to the risk of fulfilling an order for eight DVD players? Assessing transaction risk is best accomplished utilizing the data available in the order and the robust predictions of the scoring system 114. Assessing each risk category requires a different risk management strategy and has fundamentally different business decisions. Distinguishing between product and transaction risk is not always easy. However, the more one is able to distinguish between the two risk classes the better one will be able to be at designing risk management policies that are appropriate to the individual situation.

Internet based commerce may be categorized into the following the high level segmentations in Table 8.

TABLE 8

Internet Commerce Segments

| Segment Abbreviation | Segment | Internet Examples |
| --- | --- | --- |
| VH | Very High Risk Segment | Online Gift Certificates |
| H | High Risk Segment | Digital Images or "Art" |
| M | Medium Risk Segment | Music, CD's, DVD's |
| ML | Medium to Low Risk Segment | Books, Toys |
| L | Low Risk Segment | Movies, Clothing |
| VL | Very Low Risk Segment | Online Newspapers |

Although these high level segmentations are useful they are generalized, and are only intended to provide a high level indication of the relative risk, as each merchant's specific processes and procedures will significantly impact their actual fraud losses.

The scoring system 114 takes into consideration unique product differences when it assigns the risk assessment, or probability, to a scoring request. Therefore the decision of what score thresholds to implement at the merchant site should be derived as a component of the merchant's cost structure. The selection of a score threshold is not a component of product risk or market segment, rather it is a component of the merchant's costs, such as cost of goods sold, cost for intervention, etc.

There are three potential score thresholds to consider. These are:

1) the automatic decline threshold ("cutoff score")
2) the request additional information threshold ("display score"), and
3) the order outsort threshold ("outsort score").

In selecting these thresholds, the resulting performance of the system is measured with a number of metrics. The metrics used to evaluate the performance of each fraud policy include the following:

Transaction detection rate (TDR)

Transaction false positive rate (TFPR)

Dollar detection rate (DDR)

The transaction detection rate (TDR) represents the number of correctly identified fraudulent orders expressed as a percentage of all actual fraudulent orders. For instance, if there are 100 fraudulent orders and a policy correctly identifies 72 of them, the TDR is 72 percent. The transaction false-positive rate (TFPR), represents the number of orders incorrectly identified as fraudulent for each order correctly detected to be fraudulent by the rule or scoring model. A TFPR of 10:1, for example, means that for each fraudulent order detected, 10 legitimate orders are flagged as fraudulent. The dollar detection rate (DDR) is a percentage, defined as the ratio of the value of the fraudulent orders detected (in dollars) to the total dollar value of the potential fraud that would have been lost without the eFalcon system 100 in operation. For instance, if a person attempts to charge $2,000 to an account over several orders, and the system 100 identifies the account as fraudulent in time to prevent $1,000 of those charges, then the DDR is 50 percent. The DDR shows not merely whether a statistical model 316 and fraud policies catches fraud, but how fast.

What follows are some examples and formula for determining an appropriate score threshold for a merchant to intervene on an Internet order. Table 9 is used to determine how to select the appropriate score thresholds for a merchant given these table values.

TABLE 9

Score Thresholds

| Score Threshold | Percent of Fraudulent Orders Detected | Percent of Legitimate Orders Misclassified | Percent of Total Orders with Score above Threshold | DDR | TFPR |
|---|---|---|---|---|---|
| 790 | 27.70 | 0.37 | 0.49 | 32.63 | 3.00 |
| 600 | 44.60 | 1.18 | 1.37 | 45.02 | 6.00 |
| 410 | 52.16 | 3.29 | 3.50 | 50.55 | 14.00 |

Using the merchant's product net margin, the merchant can calculate an estimate of the score threshold where the break even exists for automatic declines. Once break even is calculated then the merchant can determine an appropriate level of fraud prevention intervention and potential loss of sales.

When calculating the threshold, the merchant must consider the artificial ceiling created by the association charge back monitoring percentages. These are best dealt with on a merchant by merchant basis. It is however important to note that the score threshold a merchant selects using their internal costing information may have to be lowered to keep them in compliance with association rules and regulations.

The calculations displayed first are designed to determine the automatic decline threshold. Using a score threshold of 790 in the table above yields the following calculations:

Assumptions:

The merchant's net margin is 25%. Thus in a $100.00 order, $25.00 is profit and $75.00 is cost of goods sold (COGS).

The TFPR for the score of 790 is 3.00 (a ratio of 3:1). This means in 4 orders, 1 will be fraudulent and 3 will be legitimate.

For the one fraudulent order correctly declined:

100.00×0.25=$25.00 Profit $100.00−$25.00=$75.00 Saved.

The $75 is saved because by declining the fraudulent order, the merchant saved the $75 it would have lost when the consumer did not pay for the order.

For the three legitimate orders incorrectly declined:

3×$100.00=$300.00 Total Order Value $300.00×0.25=$75.00 Lost Profit

The $75 here is lost profit because the merchant declined three transactions in which it would have a $25 profit per transaction.

Conclusion: The break even score threshold for a merchant with a net margin of 25% is approximately 790.

Using a score threshold of 600 in the above table yields the following calculations:

Assumptions:

The merchant's net margin is 14.25%. Thus in a $100.00 order, $14.25 is profit and $85.75 is COGS.

The TFPR is 6 to 1. This means in 7 orders 1 will be fraudulent and 6 will be legitimate.

For the 1 fraudulent order correctly declined $100.00×0.1425=$14.25 Profit $100.00−$14.25=$85.75 Saved For the 6 legitimate orders incorrectly declined:

6×$100.00=$600.00 Total Order Value $600.00×0.1425=$85.50 Lost Profit

Conclusion: The break even score threshold for a merchant with a net margin of 14.25% is approximately 600.

Using a score threshold of 410 in the above table yields the following calculations:

Assumptions:

The merchant's net margin is 6.6%. Thus in a $100.00 order, $6.60 is profit and $93.40 is Cost of Goods Sold.

The TFPR is 14 to 1. This means in 15 orders 1 will be fraudulent and 14 will be legitimate.

For the 1 fraudulent order correctly declined $100.00×0.0666=$6.60 Profit $100.00−$6.60=$93.40 Saved For the 14 legitimate orders incorrectly declined:

14×$100.00=$1,400.00 Total Order Value $1,400.00×0.066=$93.34 Lost Profit

Conclusion: The break even score threshold for a merchant with a net margin of 6.6% is approximately 410.

More generally then, given a merchant's net margin, the desired TFPR that should be selected is easily determined:

Desired TFPR=(1−net margin)/net margin.

In order to simply the net margin calculation, Table 10 contains the TFPR and the net margin equivalent (NME).

TABLE 10

| TFPR | Net Margin Equivalent |
|---|---|
| .50 to 1 | 150% |
| 1 to 1 | 100% |
| 2 to 1 | 33.0% |
| 3 to 1 | 25.0% |
| 4 to 1 | 20.0% |
| 5 to 1 | 17.0% |
| 6 to 1 | 14.3% |
| 7 to 1 | 12.5% |
| 8 to 1 | 11.1% |
| 9 to 1 | 10.0% |
| 10 to 1 | 09.0% |
| 11 to 1 | 08.3% |
| 12 to 1 | 07.7% |
| 13 to 1 | 07.1% |
| 14 to 1 | 06.7% |
| 15 to 1 | 06.3% |
| 16 to 1 | 05.9% |
| 17 to 1 | 05.6% |
| 18 to 1 | 05.3% |
| 19 to 1 | 05.0% |
| 20 to 1 | 04.8% |

Given the desired TFPR, the merchant then selects the score provided by the scoring system 114 which has this desired TFPR value. This selected score is then set as the cutoff score.

Once the pure score determination is made the merchant may then evaluate the desirability and need to interdict the transactions beyond the binary Yes or No decision. The following three tables outline three different levels of interdiction for five different categories of merchants. Table 11 is for the decline score, where the order is completely declined. Table 12 is for obtaining additional information, such as by the display of a browser page to request additional information, or by routing the customer to a voice over IP connection for further assistance from the merchant's customer service/fraud prevention representatives. Table 13 is when the merchant's interdiction costs are low enough and potential profit are sufficient to warrant out-sorting the order to a manual review queue.

TABLE 11

Decline Scores

| Product Category | Decline Score | TFPR | DDR |
|---|---|---|---|
| Images | 500 | 6.80 | 48.44 |
| Fenceable | 630 | 3.18 | 43.69 |
| Software | 720 | 3.01 | 38.42 |
| Physical | 780 | 1.85 | 33.65 |
| General | 780 | 1.85 | 33.65 |

TABLE 12

Additional Information Scores

| Product Category | Additional Info Score | TFPR | DDR |
|---|---|---|---|
| Images | 450>Score<499 | 13.16 | 50.32 |
| Fenceable | 570>Score<629 | 6.34 | 47.01 |
| Software | 650>Score<719 | 5.47 | 43.69 |
| Physical | 700>Score<779 | 4.16 | 39.67 |
| General | 700>Score<779 | 4.16 | 39.67 |

TABLE 13

Outsort Scores

| Product Category | Outsort Score * | TFPR | DDR |
|---|---|---|---|
| Images | 400>Score<449 & >$150.00 | 13.65 | 50.87 |
| Fenceable | 520>Score<569 & >$100.00 | 9.08 | 48.37 |
| Software | 600>Score<649 & >$60.00 | 5.66 | 45.02 |
| Physical | 630>Score<699 & >$70.00 | 5.59 | 43.69 |
| General | 630>Score<699 & >$70.00 | 5.59 | 43.69 |

*Dollar variable for outsorting rule is calculated as follows:
$150 = (14.65 orders) ($10.00 per order) = $146.50 rounds up to $150.00

Assumptions:

Each product category performs at the average consortium rate for TFPR and DDR. The consortium rates are the rates experienced across multiple card issuers.

The cost of human order intervention is assumed to be $10.00 per order.

For simplification, the DDR and TFPR for the score ranges, e.g. 450>Score<499, as an average are close enough to the values for the low end of the score range to be a good conservative extrapolation.

The cost of working at any given TFPR is derived from the cost of working an order times the number of good orders worked to find a bad order, plus the opportunity cost of working another order.

The cost of requesting additional information is sufficiently low as not to warrant inclusion in the cost structure. E.g., the automated spawning of a browser page.

Optimizing eFalcon Fraud Policies

Effective, correctly integrated fraud-detection policies are important to a successful Internet fraud prevention program. The scoring calculations performed by the scoring system 114 rely on historical transaction data to achieve optimum performance. If limited data is available, fraud policies can boost the accuracy of a merchant's fraud-risk assessment. To obtain improved accuracy, it is desirable for the merchant to evaluate the fraud policies that are expressed by the rules, and ensure integration of these policies into the merchant's order system.

Evaluating the Performance of a Merchant's Fraud Policies

After creating rules encapsulating the merchant's policies via the PMW 110, the merchant should continuously monitored the fraud-detection performance of those policies. The merchant can then adjust them to increase fraud detection, reduce redundancy or reduce the volume of outsorted orders to be evaluated by the merchant's fraud analysts via the OMW 104 or otherwise. More specifically, the merchant should measure and evaluate the performance of the merchant's fraud policies on a weekly basis, and realign the priorities in the queue of all outsorted orders, so that they are evaluated as quickly as possible, beginning with those having the highest fraud-risk scores.

Unfortunately, when effective rules are poorly integrated into the merchant's system, the result can be reduced operational inefficiency and increased fraud losses. Effective integration of eFalcon fraud policies is based on:

1. Determining which outsorted orders the merchant will evaluate first—cases resulting from fraud policies, or cases resulting from the scoring system 114 scores; and
2. Continuously measuring the performance of the merchant's fraud policies and adjusting step 1.

After the merchant measure the performance of an fraud policy or rule, the merchant compares it to the scoring system 114 scores to determine the proper integration point and prioritize outsorted orders generated by the merchant's fraud policies against those generated by the scoring system 114.

For example, if a rule has a TFPR of 20:1 and a 5% DDR, on the surface it appears the rule is highly successful. The next step, however, is critical to the integration. If the merchant discover that all or a substantial portion of the fraud cases detected by the rule are in high scoring bands, the rule is not supplementing the scoring system 114, it is duplicating it. This results in an increased volume of ineffective cases on the rules' false positives and excessive outsorted orders and operational inefficiency.

If on the other hand, the fraud cases identified by the rule are not scored highly by the scoring system 114, the rule is supplemental. The key is to evaluate the scoring system 114 scores on the rule-identified orders in addition to the evaluating pure rule performance. This additional analysis results in integrated supplemental rules instead of volume increasing duplicate rules. For example, assume the sample 20:1 and 5% rule described above identifies fraudulent orders of which the scoring system 114 identifies 50 percent in the 900+ score band and 30 percent in the 800 to 900 score band.

The rule would be best used, if at all, to identify fraud cases for those orders scoring below the 700 band. If, however, only 10 percent of the cases are identified by the scoring system 114 in the 900+ score band and 5 percent in the 800 to 900 score band, the rule would be best used to identify fraud for those orders scoring above 800, since the scoring system 114 is not readily identifying such orders as fraudulent.

Table 14 presents the integration issues. This place the priority of the example rule below the 900+ queue priority and above the 800 to 899 queue priority.

TABLE 14

| TFPR | Risk Score | DDR |
|---|---|---|
| 12.5:1 | 900+ | 60.5% |
| 25:1 | Example Rule | 5% |
| 134:1 | 800 to 899 | 10% |
| 343:1 | 700 to 799 | 3.5% |

The basic premise is to ensure that rules are not duplicative of what the scoring system 114 is already identifying as fraudulent transactions. When rules are not duplicative, it indicates how to prioritize them as outsorted orders. Once the relative position of the rule identified orders is determined, the merchant must continually monitor the rule's performance.

The above analysis should be repeated at regular intervals to ensure optimal rule and score integration. If the rule's effectiveness begins to deteriorate, the merchant should drop the ranking of the rule to a lower priority or remove it until it can be adjusted to increase its performance.

Order Management Workstation

In one system configuration, when the rule engine 112 determines that an order should be outsorted, the rule engine 112 sends scores and order data to the OMW 104. The information appears in various OMW windows, where it is available for review by customer service representatives.

The OMW 104 displays order, customer and merchant information. Having detailed order information helps representatives determine which orders are likely to be fraudulent. OMW users can view a variety of data, such as customer name and address, and details about order items. Users can also see any previous activity on the order, and enter comments.

After reviewing the data, the representative can determine whether the order is fraudulent, and decide to hold, accept, or reject the order. The OMW 104 also allows the merchant to specify the reason for the decision, such as non-sufficient funds (NSF) or an anonymous email address.

If a representative wants to accept an order immediately, without reviewing the data (for example, if the order is placed by a known good customer), an Accept Order option processes the order with no further action required.

In addition to review functions, the OMW enables supervisors or other authorized personnel to create queues, add new users to the OMW, and perform other administrative tasks.

The OMW may be installed on the same machine as the PMW 110, or on a separate machine, as illustrated in FIG. 1.

Defining Queues

Queues are tools that group orders according to like characteristics (for example, orders over $2,000) and direct those orders to specific representatives for review. The OWM 104 gives authorized users the ability to define and create queues according to user-specified criteria. This queue definition feature gives the merchant the ability to control and direct workflow.

Through the use of queues, administrators select the type of orders that go to each representative, making the most efficient use of available resources. If no queues are specifically defined, default queues determine the sequence in which orders are presented. Once a queue is defined, it may be assigned to one, multiple, or all representatives.

OMW Security

Access to the OMW 104 is controlled by user logon IDs and, optionally, by user passwords. Each user is linked with a group. The group determines which OMW orders are available to that user. Typically, administrators have access to all OMW options, but the options available to representatives are restricted. If a user does not have access to an option, it does not appear on that user's menu list.

OMW Access Privileges

User IDs and passwords (if used) regulate access to the OMW. The OMW options that a user can use depend on the group (access level) assigned to the user's ID. There are four groups for the OMW.

Group Level 1: Review orders, update customer data, assign an order status, accept orders, select a queue, search for customers and orders, reply to letters, change user's own password, and use the tools options.

Group Level 2: Review orders, update customer data, assign an order status, accept orders, select a queue, search for customers and orders. Maintain user information (add and delete OMW users), change user passwords, define queues and assign queues to users, view queue statistics, reply to letters, and use the tools options.

Admin Group: Do all OMW menu functions.

Security Group: Maintain user information (add and delete OMW users), change user password, maintain window display lists, and use the tools options.

Order Review Procedures

Customer service representatives who are users of the OMW 104 follow certain procedures when reviewing orders and taking action based on the information. The procedures include the following:

Display orders for review
View order, customer, and merchant data
View negative files and chargeback information
Send letters to customers
Review any previous order activity
Assign a status to an order
Accept, hold, or reject an order a) Reviewing an Order When the rule engine 112 analyzes order data, if the activity meets predefined criteria as defined by its rule bases, the rule engine 112 routes the order to the OMW 104. Orders go into queues set up by a supervisor or other authorized user. The queues then present the orders to representatives for review.

Figures 6, 7:
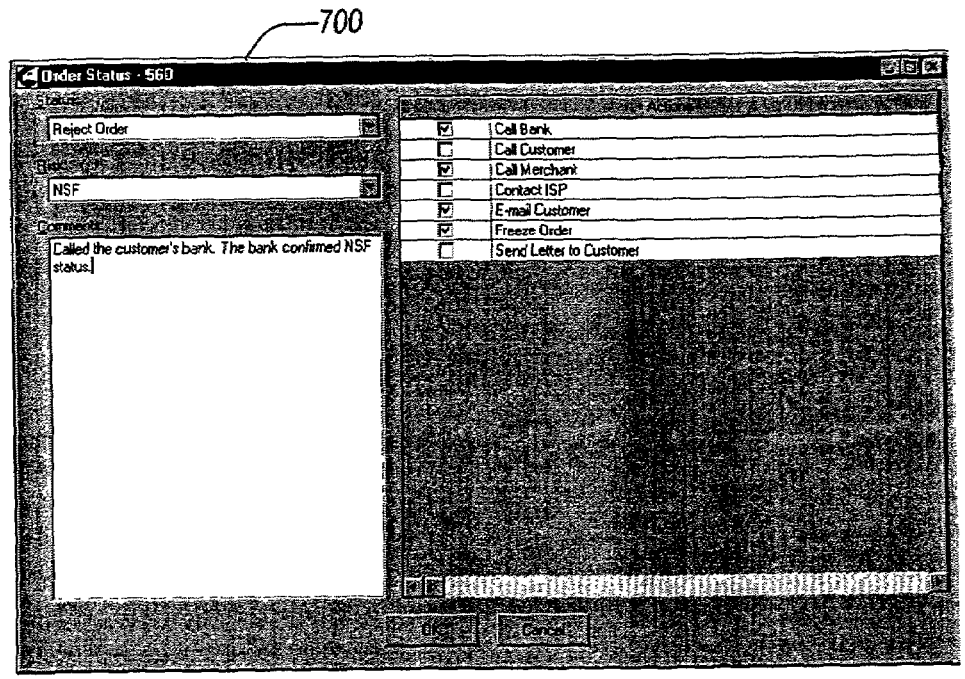
FIG. 6 is a screen shot of a sample queue's content.
FIG. 7 is a screen shot of an order status window.

FIG. 6 illustrates a sample queue 600. Each order is shown with various data, such as order ID, date, time, authorization data, card number, and so forth.

The user can select certain orders to view, and display windows that contain customer and merchant data (email address, contact name, phone number, and so on), and detailed order information. The user may also enter comments about the status of the order, conversations with the customer, or the like. A letter log window displays a history of any letters sent or received pertaining to order. Chargeback and retrieval information is also available to the user, along with any negative file related data.

The user can also send email to the customer (since the email address is included in the order information), a fax, or a printed letter. These communications may be drafted from scratch, or may be based on templated form letters.

After reviewing the information, the user can assign an order status to the order to indicate the results of his investigation and record actions taken or recommended. The user may also accept the order with an Accept Order function. The user may also place negative information about the customer in one or more of the negative files. An order actions window allows users to view a history of activity on the order, and to update the information pertaining to the customer or order at any time. The user may also search for customers or orders based on any indexed order field.

If the user has access to multiple queues, then any of these queues can be selected for processing. As queues are processed by the user or others, the user may request to rebuild the queue to see only orders not yet handled.

The OMW provides data sorting and filtering tools that the user can use in a variety of ways. These include ascending and descending sorts on any field name available for display. Filters can likewise be set on any field to further limit the data displayed in a user's queue. Multi-field sorts and fields may also be defined, using complex mathematical or Boolean operations. All field types can be evaluated with the pre-defined comparisons, greater than >, less than <, equal to =, not equal to <>, greater than or equal to >=, or less than or equal to <=. In addition, text fields can be used with the LIKE operator to find wildcards (matching data) within text strings. Numeric and date comparison values can have a specific value. For example, a ship date field can be compared to NOW() plus 7 days to identify orders which are to ship within 7 days.

b) Assigning a Status to an Order

More specifically, after the user reviews the order information and make a decision, the user can select actions and assign a status to an order. FIG. 7 illustrates an Order Status window 700 use to assign or change a status, and to record information about the order. The Order Status window 700 allows the merchant to record the results of its investigation, specify the type of risk encountered, and indicate actions requested or taken. Each site determines its own risk categories and actions. The merchant can also use the Order Status window 700 to add information to negative files, or to forward the order to another representative. In this window, the user can select a status 702 to apply to the order, classify the type of risk 704, add comments 706, and check off which actions 708 have been taken. The statuses available include:

Accept Order: Accept the order and remove it from the open order queues.

Add to Negative File: Add the customer's name or other information to the negative file list. When selected, a window appears that allows the user to record the types of negative information discovered. The user may include a reason the negative information is being added, along with an expiration date after which the customer's data is removed from the negative file.

Forward: Put this order in another user's queue. (The order does not return to the original representative.)

Hold Shipment: Do not send the shipment until the date specified. A calender is provided to select the date. The held order is removed from its current queues. When the date is reached, the order reappears in the working queues for handling.

Reject Order: Reject the order and remove it from the order queues.

Defining Queues

A Queue Editor gives authorized users the tools to create customized work queues. Queues may be defined to group orders by score, order status, or a variety of other options. For example, a queue called High Dollar Amount may collect orders with totals that exceed $500.00. Then, as the rule engine 112 and OMW 104 analyze order data, all orders that meet the requirement go to that queue.

Figure 8:
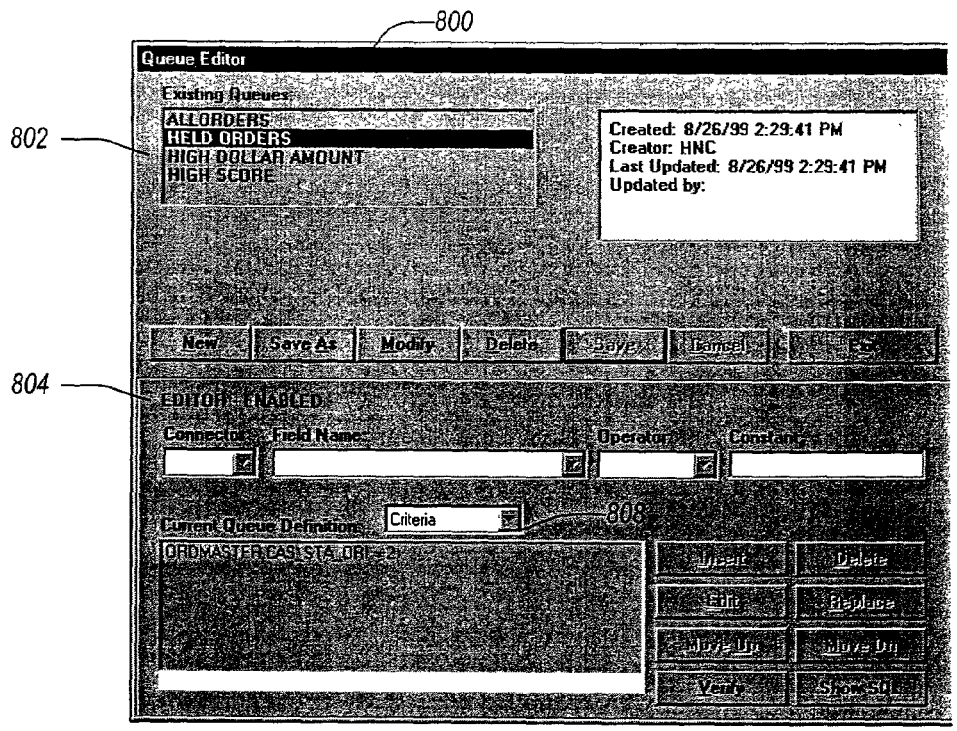
FIG. 8 is a screen shot of a queue editor window.

FIG. 8 illustrates a Queue Editor 800 used to create new queue definitions, modify or delete existing definitions. The Queue Editor 800 has two sections, the Queue section 802 and the Editor section 804. The features of these sections are as follows:

a) The Queue Section

Existing Queues—A list of the current queues.

Created Area—The person who created the queue, the date the queue was created, the last person who modified the queue, and the date the queue was last modified.

New—Create a new queue.

Save As—Copy the selected queue.

Modify—Make changes to the selected queue.

Delete—Delete the selected queue. A queue can only be deleted if no representatives are assigned to the queue.

Save—Save the queue.

Cancel—Erase the new or changed queue data.

Exit—Return to the OMW main window.

b) The Editor Section

Criteria and Order By Fields—Criteria allows selection of fields for the queue definition. Order By allows sorting orders within a queue by specific field values.

Current Queue Definition—The existing queue definition for the selected queue.

Insert—Inserts the statement into the Current Queue Definition area. This button is active only when there are entries in the queue component fields.

Delete—Delete the highlighted statement in the Current Queue Definition field. This button is active only when the statement is highlighted. Deletes only the highlighted text.

Edit—Edit the statement in the Current Queue Definition area. This button is active only when a statement is highlighted.

Replace—Replace the current queue definition with the definition in the component fields. This button is active only after selection of the Edit button.

Move Up—When there are multiple statements in the Current Queue definition area, move the highlighted statement up one line. This button is active only when a statement is highlighted.

Move Down—When there are multiple statements in the Current Queue definition area, move the highlighted statement down one line. This button is active only when a statement is highlighted.

Verify—Confirm that the queue definition is accurate.

Figure 10:
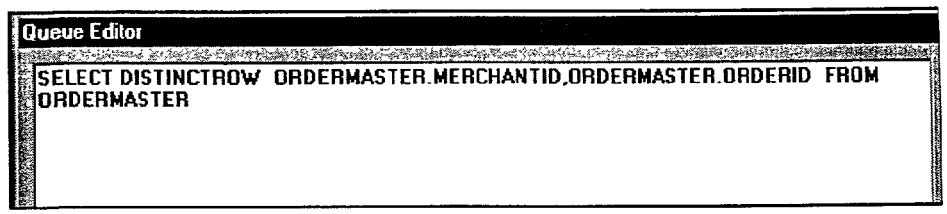
FIG. 10 illustrates a sample SQL statement used to select orders for a queue.

Show SQL—Show the Structured Query Language (SQL) statements used by the OMW to select orders for the queue. FIG. 10 illustrates an example SQL statement.

c) Building Queue Definitions

An order must meet the conditions of the queue definition to be added to a queue. Queues are defined with logical statements having the basic format:

Field Name-Operator-Constant-Connector (optional)

The following list describes the queue components.

Figure 9:
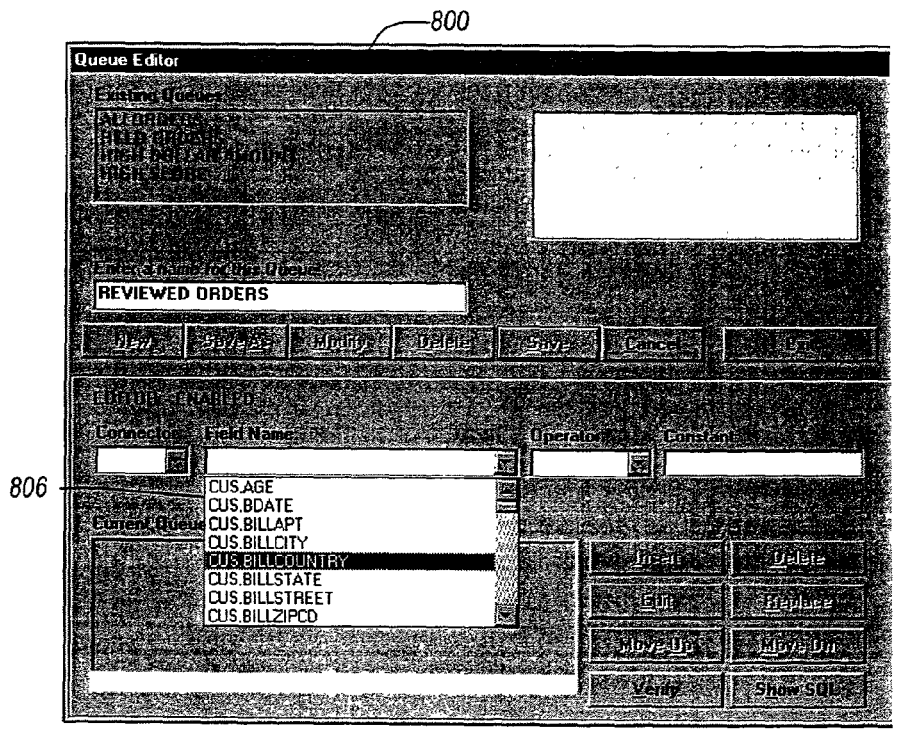
FIG. 9 is a screen shot showing a list box for selecting a fields for queue definition.

Field Name: This list box contains customer and order data fields to use in a queue definition. Each field name has a prefix, which is set off from the field by a period. The prefix represents the name of the table that stores the field in the database. For example, the field CUS.BILLCOUNTRY is the customer's city as it appears in the billing address, and it is stored in a Customer Data Table. FIG. 9 illustrates an example of this list box 806 for selecting a field.

Operator: The operator is the mathematical operation the OMW 104 uses to compare the field values of an order. The operators are: >, <,=, >=, <=, <>, and LIKE. LIKE finds entries where the data is like the constant data. A list box is provided for selecting the operator.

Constant: The constant is an alphabetic or numeric value. Unlike the other queue components, the constant value is specified directly in the field, for example a specific zip code or currency amount. The field name determines whether the constant field accepts alphabetic characters, numeric characters, or both.

Connector—The optional connector links statements to form compound statements. The connectors are AND, NOT, AND_NOT, OR, and OR_NOT.

For example, a queue called High Dollar Amount may be defined by the queue definition statement

ORDMASTER.TOTAL>500.

In this definition, the field name is ORDMASTER.TOTAL (total amount of the order), the operator is > (greater than), and the constant is 500 (five hundred dollars). In this example, the queue will contain only orders with totals over $500.00.

The Connector field link multiple queue statements together. For example, a queue called High Scoring New Orders may have the queue definition

ORDERMASTER.CAS_STA=0 AND ORDMASTER.SCOR>900.

In this definition, an order must meet both criteria; the order must have a status of 0 (a new order) and receive a score greater than 900. For compound statements, the position of statements in the definition determines the priority. In other words, the OMW acts on the first statement in the definition, then the second statement, and so on.

After building a queue definition, the Queue Editor checked the definition to be sure that it is formatted correctly, and that the fields in the definition exist in the database. After the Queue Editor checks the definition, it displays a message that indicates whether the queue definition is valid, and whether any orders meet the queue definition.

d) Maintaining Queues

A user may create a new queue from scratch, or if there is an existing one that closely matches the queue the user wants to create, the user can copy the existing queue and make changes. The user may can also change and delete queues.

Figure 11:
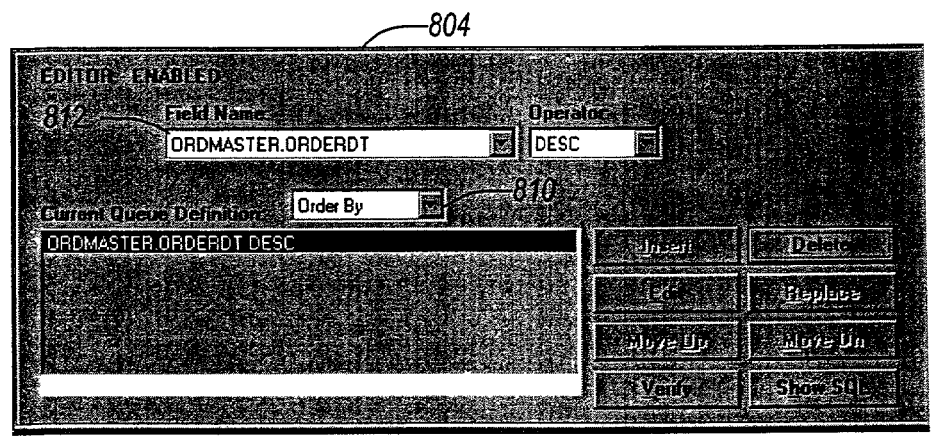
FIG. 11 is a screen shot of the queue editor window for setting the ordering of a queue.

The user may use an Order By option to sort orders within a queue. When the Queue Editor 804 window first appears, the OMW defaults to Criteria mode 808 for the current queue definition. In this mode, the user defines the queue parameters, as discussed above. When the mode is switched to Order By, as illustrated in FIG. 11, the Editor 804 displays the fields used to prioritize orders within the queue. The Field Name 812 displays the sort fields, and the operator allows sorting orders in either ascending (ASC) or descending (DESC) succession. In this example, the orders will be presented by oldest order first, since the Field Name ORDMASTER.ORDERDT for order date is selected, along with the operator DESC for descending. If the user does not select a sequence, the default sequence is descending order by score.

e) Assigning Queues to Users

Figure 12:
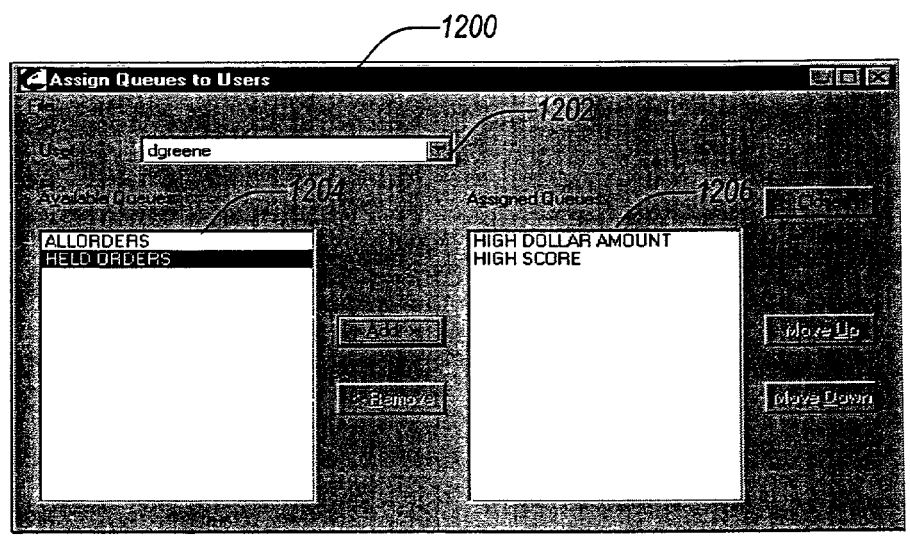
FIG. 12 is a screen shot of the assign queue window.

Referring to FIG. 12, the Assign Queues to Users window 1200 allows an authorized user to assign one or more order queues to each user. If desired, the user can customize their own work flow by assigning queues that contain specific types of orders. For example, one representative may be assigned to review all held orders, another review all callbacks. Once the queues are assigned, a representative receives orders only from those queues. The Assign Queues to Users window 1200 the queues currently assigned to a user, and the queues available for assignment. The sections and buttons in the Assign Queues to Users window are:

User 1202: A list of all OMW users.

Available Queues 1204: Queues not assigned to the listed user.

Assigned Queues 1206: Queues assigned to the listed user

Add: Move the highlighted selection in the Available Queues list to the Assigned Queues. This button is active only when an available queue is highlighted.

Remove: Move the highlighted selection in the Assigned Queues list to the Available Queues. This button is active only when an assigned queue is highlighted.

Move Up: When there are multiple queues in the Assigned Queue list, move the highlighted queue up one line. This button is active only when an assigned queue is highlighted.

Move Down: When there are multiple queues in the Assigned Queue list, move the highlighted queue down one line. This button is active only when an assigned queue is highlighted.

Figure 13:
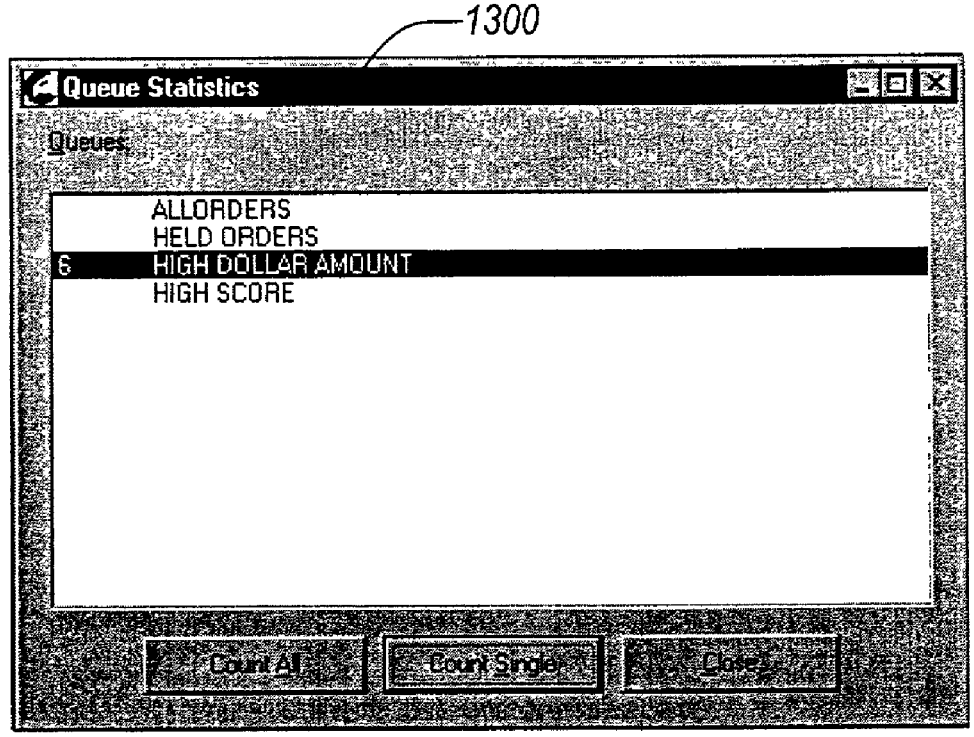
FIG. 13 is a screen shot of the view queue statistics window.

FIG. 13 illustrates a View Queue Statistics window 1300 which displays a total number of orders in each OMW queue or display totals for all queues. This feature helps evaluate the distribution of orders in the eFalcon system, to see, for example, if a representative is receiving too many or too few orders.

As will be understood by those familiar with the art, the invention may be embodied in other specific forms without departing from the spirit or essential characteristics thereof. First, as noted above, the present invention is not limited to credit cards, but may be used with debit card, telephone calling cards, gift certificate cards, ACH transactions, micropayments, and the like. Second, the particular division of functionality between the various system components described herein is merely exemplary, and not mandatory; functions performed by a single system component may instead be performed by multiple components, and functions performed by multiple components may instead performed by a single component, given the variety of software development environments and hardware platforms that may be used to practice the invention. Thus, the particular functions of the rule engine, policy management engine, scoring server, order management workstation, and so forth may be provided in more, fewer, of different combinations of modules. Further, the system may be implemented via a combination of hardware and software, as described, or entirely in hardware elements. Also, the statistical model may be implemented in a variety of modes, including a neural network, a multivariate regression model, or any other model that classifies inputs based on statistical analysis of historical exemplars. The particular capitalization or naming of the modules, protocols, features, attributes, data structures, or any other aspect is not mandatory or significant, and the mechanisms that implement the invention or its features may have different names or formats; likewise the details of the specific data structures, messages, and APIs may be changed without departing from the features and operations of the invention. Finally, it should be noted that the language used in the specification has been principally selected for readability and instructional purposes, and may not have been selected to delineate or circumscribe the inventive subject matter.

Accordingly, the disclosure of the present invention is intended to be illustrative, but not limiting, of the scope of the invention, which is set forth in the following claims.

We claim:

1. A computer implemented method for processing an online transaction, the method comprising the steps of:
generating from an online transaction of a purchaser, a plurality of keys from key fields of the transaction that individually do not reliably identify the purchaser;
for each key, retrieving a profile of historical transactions associated with the key;
weighting each profile with a weight indicating a degree to which the profile is associated with current purchaser;
generating a contrast measure using at least two of the profiles, and
generating a fraud score using said contrast measure indicative of the likelihood of fraud in the online transaction as a function of the weighted profiles and the current transaction.

2. The method of claim 1, wherein the key fields of the online transaction includes fields associated with any of purchaser identification information, order information, and payment information.

3. The method of claim 1, wherein each profile for a key includes a plurality of summary variables derived from the associated historical transactions, and which summarize the historical transactions having the key in a key field of the historical transactions.

4. The method of claim 1, further comprising the step of:
using the fraud score to determine whether to obtain additional information prior to completing the transaction.

5. The method of claim 4, further comprising the step of:
responsive to determining to obtain additional information, presenting a form with questions selected to obtain the additional information from the purchaser.

6. The method of claim 1, further comprising the step of:
using the fraud score to determine whether to hold the transaction for further review by a human analyst.

7. The method of claim 6, further comprising the step of:
responsive to determining to hold the transaction for further review, outsorting the transaction to a file for review by human analyst to determine whether to decline or approve the transaction, or obtain additional information prior to completing the transaction.

8. The method of claim 1, further comprising the step of:
using the fraud score to determine whether to approve the transaction or decline the transaction.

9. The method of claim 8, further comprising the step of:
responsive to determining to approve the transaction, completing the transaction order and fulfilling payment instructions for the order.

10. The method of claim 8, further comprising the step of:
responsive to determining to decline the transaction, transmitting a signal indicating that the transaction is declined.

11. The method of claim 8, wherein using the fraud score to determine whether to approve the transaction or decline the transaction further comprises the step of:
applying a plurality of rules to the fraud score and to the transaction.

12. The method of claim 8, wherein using the fraud score to determine whether to approve the transaction or decline the transaction further comprises the steps of:
storing velocity data based on an attribute of the transaction, the velocity data measuring a frequency of the attribute in a plurality of transactions; and
applying a velocity rule to the velocity data.

13. The method of claim 8, wherein using the fraud score to determine whether to approve the transaction or decline the transaction further comprises the step of:
declining the transaction if the fraud score is below a cutoff score, wherein the cutoff score is a function of a net margin of a merchant receiving the transaction.

14. The method of claim 8, wherein using the fraud score to determine whether to approve the transaction or decline the transaction further comprises the steps of:
for each of a plurality of different product categories, defining a different cutoff score; and
responsive to the product category pertaining to the transaction, applying the cutoff score for the product category to the fraud score.

15. A method for developing a statistical model of online transactions, the method comprising the steps of:
storing from a plurality of different online merchants, transactions for a plurality of different purchasers, each transaction indicated as being fraudulent or non-fraudulent;
for each of a plurality of key fields of the transaction, including at least one key field for which all of the possible keys of the key field do not reliably identify a purchaser of the transaction, generating for each key of the key field, a profile for all of the transactions having a matching key for the key field, such that at least one profile summarizes the transactions of a plurality of different individuals;
generating a contrast measure comparing the summary variables of at least two of the profiles; and
training a statistical model to generate a score for a transaction, the score indicative of a likelihood that the transaction is fraudulent, by using as training inputs to the statistical model selected transactions, the profiles associated with the keys of the key fields of each selected transaction, and the contrast measures associated with the profiles.

16. The method of claim 15, further comprising the steps of:
setting a cutoff score for rejecting a transaction by;
determining a desired transaction false positive rate as a function of a net margin;
selecting the score generated by the statistical model having an actual transaction false positive rate substantially similar or identical to the desired transaction false positive rate.

17. The method of claim 16, wherein determining a desired transaction false positive rate as a function of a net margin comprises the step of:
setting the transaction false positive rate TFPR according to the equation:

$$TFRP = \frac{1 - \text{Net Margin}}{\text{Net Margin}}.$$

18. The method of claim 15, wherein generating a contrast measure comprises computing a ratio of the summary variables of the at least two profiles.

19. A computer implemented method for processing an online transaction, comprising the steps of:
generating from the online transaction of a purchaser, a plurality of keys from key fields of the transaction that individually do not reliably identify the purchaser;
for each key, retrieving a profile of historical transactions associated with the key, each profile including at least one summary variable;
computing at least one contrast measure for a summary variable included in the set of profiles; and
inputting the contrast measures, the online transaction data and the selected set of profiles into a predictive model to generate a fraud score indicative of the likelihood of fraud in the online transaction.

20. The method of claim 19, wherein the key fields of the online transaction includes fields associated with any of purchaser identification information, order information, and payment information.

21. The method of claim 19, wherein each profile for a key includes a plurality of summary variables derived from the associated historical transactions, and which summarize the historical transactions having the key in a key field of the historical transactions.

22. The method of claim 19, wherein computing at least one contrast measure for a summary variable comprises computing a ratio of the summary variables of the profiles.

23. The method of claim 19, further comprising the steps of:
comparing the fraud score to a plurality of thresholds to determine whether to approve the transaction, decline the transaction, obtain more information for the transaction, or hold the transaction for further review by a human analyst;
responsive to determining to approve the transaction, completing the transaction order, and fulfilling payment instructions for the online order, and completing the transaction;
responsive to determining to decline the transaction, transmitting to the purchaser/the merchant/a signal indicating that the transaction is declined;
responsive to determining to obtain additional information that is necessary to complete the transaction, presenting a form with questions selected to obtain the additional information from the purchaser; and
responsive to determining to hold the transaction for further review, outsorting the transaction to a file for review by human analyst to determine whether to decline, approve or obtain additional information.

24. The method of claim 23, wherein comparing the fraud score to a plurality of thresholds comprises the steps of:
storing velocity data based on an attribute of the transaction, the velocity data measuring a frequency of the attribute in a plurality of transactions; and
applying a velocity rule to the velocity data.

25. The method of claim 23, wherein comparing the fraud score to a plurality of thresholds further comprises the steps of:
for each of a plurality of different product categories, defining a different cutoff score; and
responsive to the product category pertaining to the transaction, applying the cutoff score for the product category to the fraud score.

26. The method of claim 25, wherein determining whether to decline the transaction further comprises the step of:
declining the transaction if the fraud score is below a cutoff score, wherein the cutoff score is a function of a net margin of a merchant receiving the transaction.

27. The method of claim 26, wherein the cutoff score as a function of a net margin comprises the step of:
setting the cutoff score to be a transaction false positive rate TFPR according to the equation:

$$TFRP = \frac{1 - \text{Net Margin}}{\text{Net Margin}}.$$

28. A computer implemented method for processing transactions to statistically identify a current purchaser, comprising the steps of:
receiving a transaction;
generating from the transaction a plurality of keys, including keys containing keys that individually do not reliably identify the purchaser;
for each key, retrieving a profile summarizing historical transactions by purchasers whose profiles match the key;
weighting each of the retrieved profiles by a weight indicating the degree to which the profile is associated with the current purchaser;
predicting the likelihood of fraud in the current transaction as a function of the weighted profiles and the current transaction.

29. A computer implemented method for identifying a current purchaser of online transaction, comprising the steps of:
receiving an online transaction from a current purchaser, the online transaction including purchaser identification information;
generating from the online transaction a plurality of keys that individually do not reliably identify the current purchaser;
for each key, retrieving a profile summarizing a plurality of historical transactions associated with the key, each profile including a plurality of summary variables derived from the associated historical transactions; and
selecting as the profiles of the current purchaser the profiles having the most similar summary variables.

30. A system for processing online transactions, the system comprising:
a rule engine that receives from a scoring system a fraud score associated with a transaction, wherein said scoring system uses a summary variable in generation of said fraud score, the fraud score indicating the likelihood of fraud in the transaction, which applies a plurality of stored rules to the fraud score, each rule providing a condition and an action to perform in response to the transaction or the fraud score, to determine according to the rules whether to approve or decline the transaction, request more information from the purchaser, or hold the transaction for review by a human analyst;
an outsort management workstation that receives from the rule engine transactions to be held for review, stores the transactions in queues, and provides access to the queues to a human analyst in order to review transactions in the queues, the outsort management workstation further adapted to define for each queue at least one criteria for associating a transaction with the queue; and
a policy management workstation adapted to access the stored rules, and define rules for the rule engine to apply.

31. A system for scoring a transaction, the system comprising:

storing means storing a plurality of stored profiles, each profile associated with a key for one of a plurality of key fields of a transaction, the key fields including at least one key field that does not reliably identify a purchaser of a transaction, each profile including summary variables summarizing all transactions having a same key for at least one of the key fields; and
    a processor processing a statistical model that receives as inputs a transaction, a plurality of profiles, each profile summarizing transactions associated with a key for a key field, and at least one contrast measure that weights selected pairs of the profiles, and that produces a fraud score indicating the likelihood of fraud in the transaction.

32. The system of claim 31, wherein the at least one contrast measure is a ratio of the summary variables of a selected pair of profiles.

33. A method for establishing a cutoff score for a transaction processing system that processes transactions of a merchant, comprising the steps of:

providing a statistical model built in a supervised learning environment, wherein said statistical model generates a score categorizing a transaction, the score used by the merchant to accept or reject the transaction;
    determining for each of a plurality of scores generated by the statistical model an actual transaction false positive rate;
    determining a desired transaction false positive rate as a function of the merchant's net margin; and setting the cutoff score for rejecting transactions as a score having an actual transaction false positive rate approximating or equal to the desired transaction false positive rate.

34. The method of claim 33, wherein determining a desired transaction false positive rate as a function of the merchant's net margin comprises the steps of:

setting the transaction false positive rate TFPR according to the equation:

$$TFRP = \frac{1 - \text{Net Margin}}{\text{Net Margin}}$$

wherein Net Margin is the merchant's net margin.

35. A computer implemented system for processing an online transaction, comprising:

means for receiving an online transaction from a current purchaser, the online transaction including purchaser identification information, order information, and payment information;
    means for generating from the online transaction a plurality of keys that individually do not reliably identify the current purchaser;
    means for retrieving a profile summarizing a plurality of historical transactions associated with the each key;
    means for weighting each profile with a weight indicating a degree to which the profile is associated with current purchaser; and
    means for generating a fraud score indicative of the likelihood of fraud in the online transaction as a function of the weighted profiles and the current transaction.

36. A system for developing a statistical model of online transactions, comprising:

a database storing transactions from a plurality of different online merchants, the transactions for a plurality of different purchasers, each transaction indicated as being fraudulent or non-fraudulent;
    first generating means generating for each of a plurality of key fields of the transaction—including at least one key field for which all of the possible keys of the key field do not reliably uniquely identify a purchaser of the transaction—a profile for all of the transactions having a matching key for the key field, such that at least one profile summarizes the transactions of a plurality of different individuals;
    second generating means for generating a contrast measure comparing the summary variables of at least two of the profiles; and
    training means training a statistical model to generate a score for a transaction, the score indicative of a likelihood that the transaction is fraudulent, by using as training inputs to the statistical model selected transactions, the profiles associated with the keys of the key fields of each selected transaction, and the contrast measures associated with the profiles.

37. A system for processing online transactions, the system comprising:

a rule engine having a function of determining whether to approve a transaction, decline the transaction, request more information from the purchaser of the transaction, or hold the transaction for review by a human analyst by way of receiving a fraud score for the transaction from a scoring system and applying rules to the fraud score, wherein said scoring system uses a contrast measure in generation of said fraud score, wherein each rule defines a condition and an action to perform in response to the fraud score, to produce a determination for handling the transaction;
    an outsort management workstation having a function of queuing transactions to be held for review and providing access to the queues to a human analyst in order to review transactions in the queues by way of receiving from the rule engine transactions to be held for review and storing the transactions in queues, each queue having at least one criteria for storing a transaction in the queue, to produce a set of queues, each queue storing one or more transactions; and
    a policy management workstation having a function of defining rules for the rule engine to apply, by way of providing access to the stored rules.

38. The method of claim 15, wherein said step of training a statistical model uses a supervised learning environment.

39. The method of claim 15, wherein said model comprises any of:
    a neural network; and
    a regression model.

40. The method of claim 15, wherein said step of training a statistical model further comprises the step of:
    preprocessing said at least one key field.

41. The method of claim 29, wherein said summary variables describe historical purchasing behavior.

42. The system of claim 30, wherein said fraud score comprises:
    a scaled score.

43. The system of claim 30, wherein said scoring system further uses a contrast measure in addition to said summary variable in generation of said fraud score.

44. The system of claim 37, wherein said scoring system comprises use of a summary variable in generation of said fraud score.

45. The method of claim 33, further comprising the step of:
preprocessing data input into said model.

46. The method of claim 33, wherein said model is trained using a self-learning computerized system.

47. The method of claim 33, wherein said model comprises use of a neural network.

48. The method of claim 33, wherein said model comprises use of a contrast measure.

49. The method of claim 33, wherein said model comprises a regression model.

* * * * *